United States Patent [19]
Suzuki

[11] Patent Number: 5,943,047
[45] Date of Patent: *Aug. 24, 1999

[54] TWO-WAY INFORMATION TRANSMISSION SYSTEM, TWO-WAY INFORMATION TRANSMISSION METHOD AND SUBSCRIBER TERMINAL DEVICE

[75] Inventor: Mitsuhiro Suzuki, Chiba, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/824,488

[22] Filed: Mar. 27, 1997

[30] Foreign Application Priority Data

Apr. 9, 1996 [JP] Japan .................................. 8-111877

[51] Int. Cl.⁶ .............................. H04N 7/10; H04N 7/14
[52] U.S. Cl. .............................. 345/327; 348/12; 348/13; 455/5.1
[58] Field of Search ............................... 345/327; 348/12, 348/13, 10, 6, 7; 455/5.1, 4.2, 6.2, 6.3, 3.1; H04N 7/10, 7/14

[56] References Cited

U.S. PATENT DOCUMENTS

| | | | |
|---|---|---|---|
| 5,351,075 | 9/1994 | Herz et al. ................................... | 348/1 |
| 5,410,343 | 4/1995 | Coddington et al. ........................ | 348/7 |
| 5,453,779 | 9/1995 | Dan et al. .................................... | 348/7 |
| 5,555,441 | 9/1996 | Haddad ........................................ | 348/3 |
| 5,592,612 | 1/1997 | Birk ............................................. | 348/7 |
| 5,686,961 | 11/1997 | Gasztoni et al. ........................ | 348/408 |

*Primary Examiner*—Nathan Flynn
*Assistant Examiner*—Vivek Srivastava
*Attorney, Agent, or Firm*—Jay H. Maioli

[57] ABSTRACT

The subscriber terminal ms sends the demand including at least information for identifying the demand subscriber terminal, information for identifying the requested information, and information relating to the urgency of the requested information to the information distribution transmission center HE through an going-up line. The information distribution transmission center HE plans a transmission schedule of the information to be transmitted based on the demand from the subscriber terminal ms, and transmits the transmission schedule information included in the down-going control data to the subscriber terminal which sent the demand prior to the actual transmission, and transmits the requested information according to the above-mentioned transmission schedule. The subscriber terminal ms receives and analyzes the down-going control data from the information distribution transmission center HE and is informed of the transmission schedule, and acquires the information to be transmitted based on the obtained transmission plan, stores the acquired information in a large scale memory, and reads the information from the memory means for use. A video on-demand system can be realized without introducing a large scale system such as video server and with a relatively small investment, and the centralization of traffic is mitigated, and the network resource is used efficiently.

11 Claims, 21 Drawing Sheets

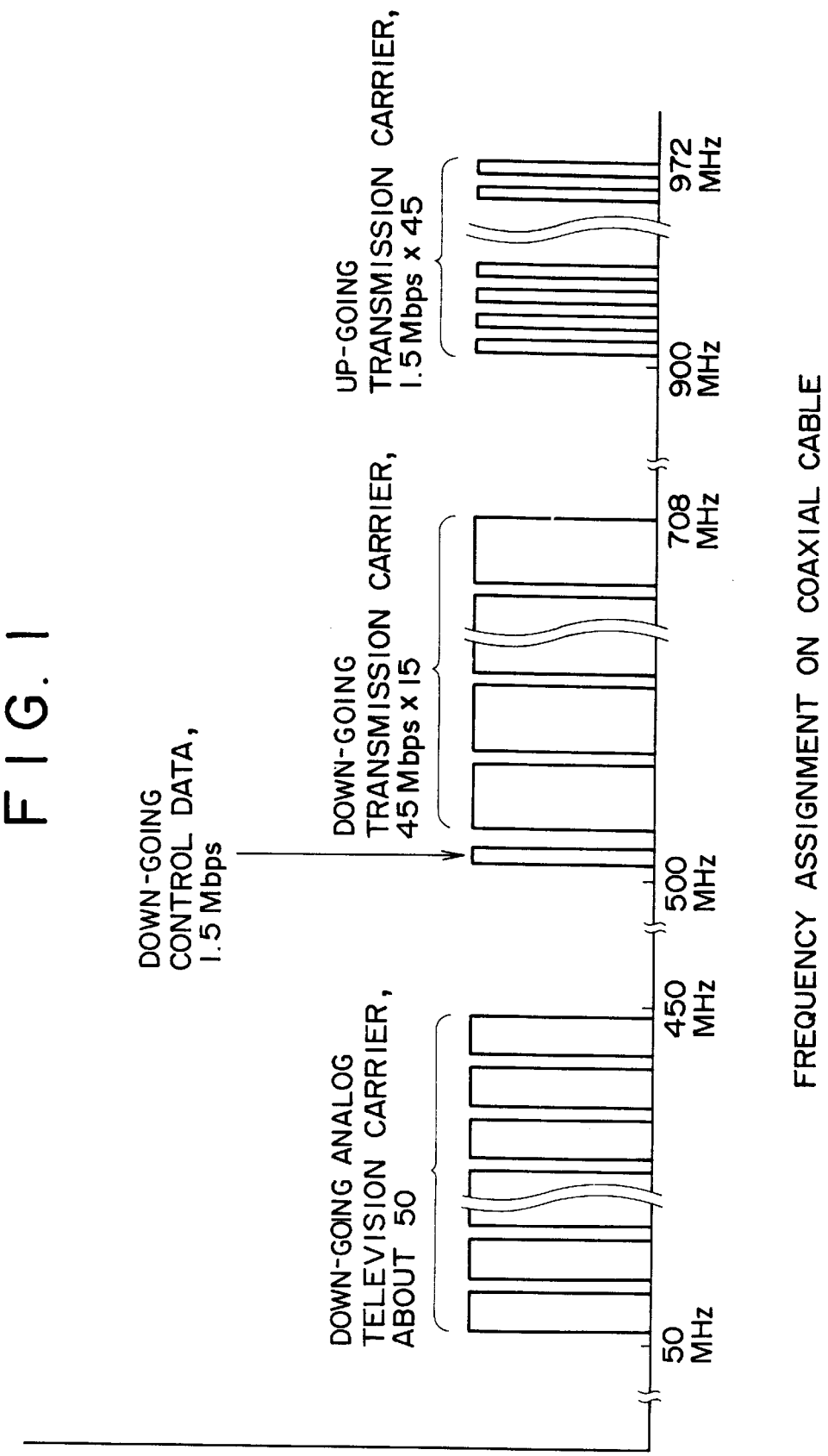
FIG. 1 FREQUENCY ASSIGNMENT ON COAXIAL CABLE

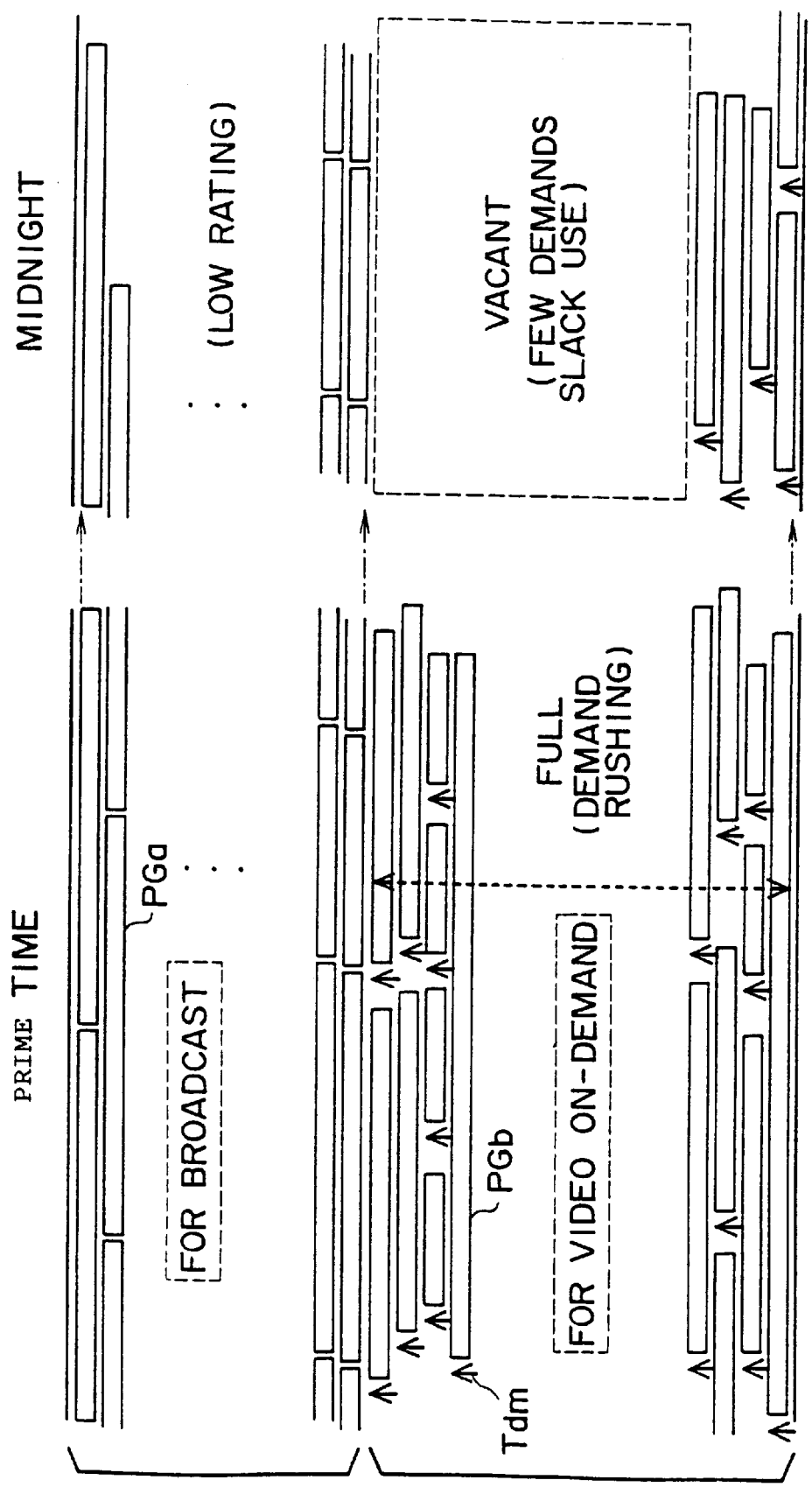

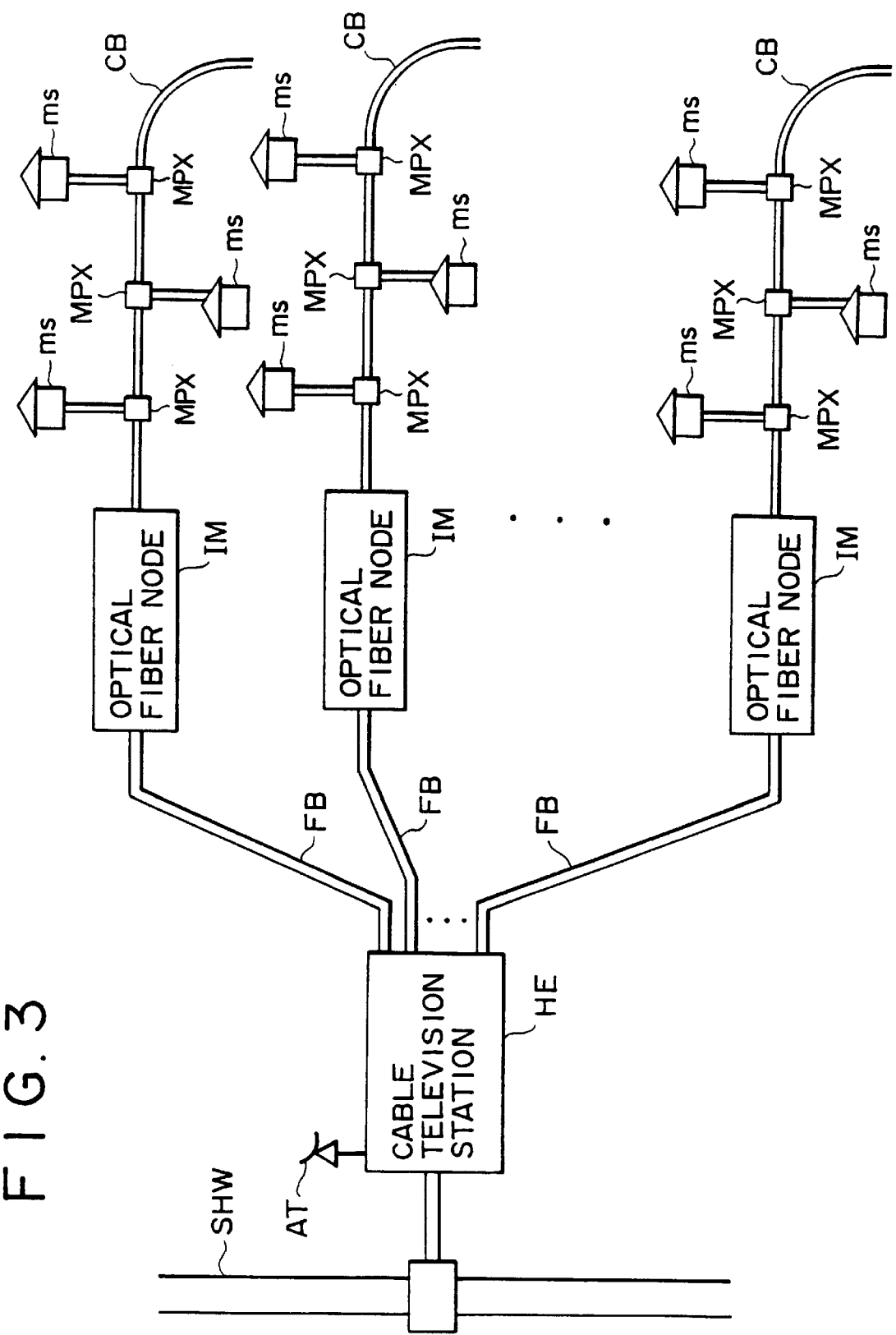

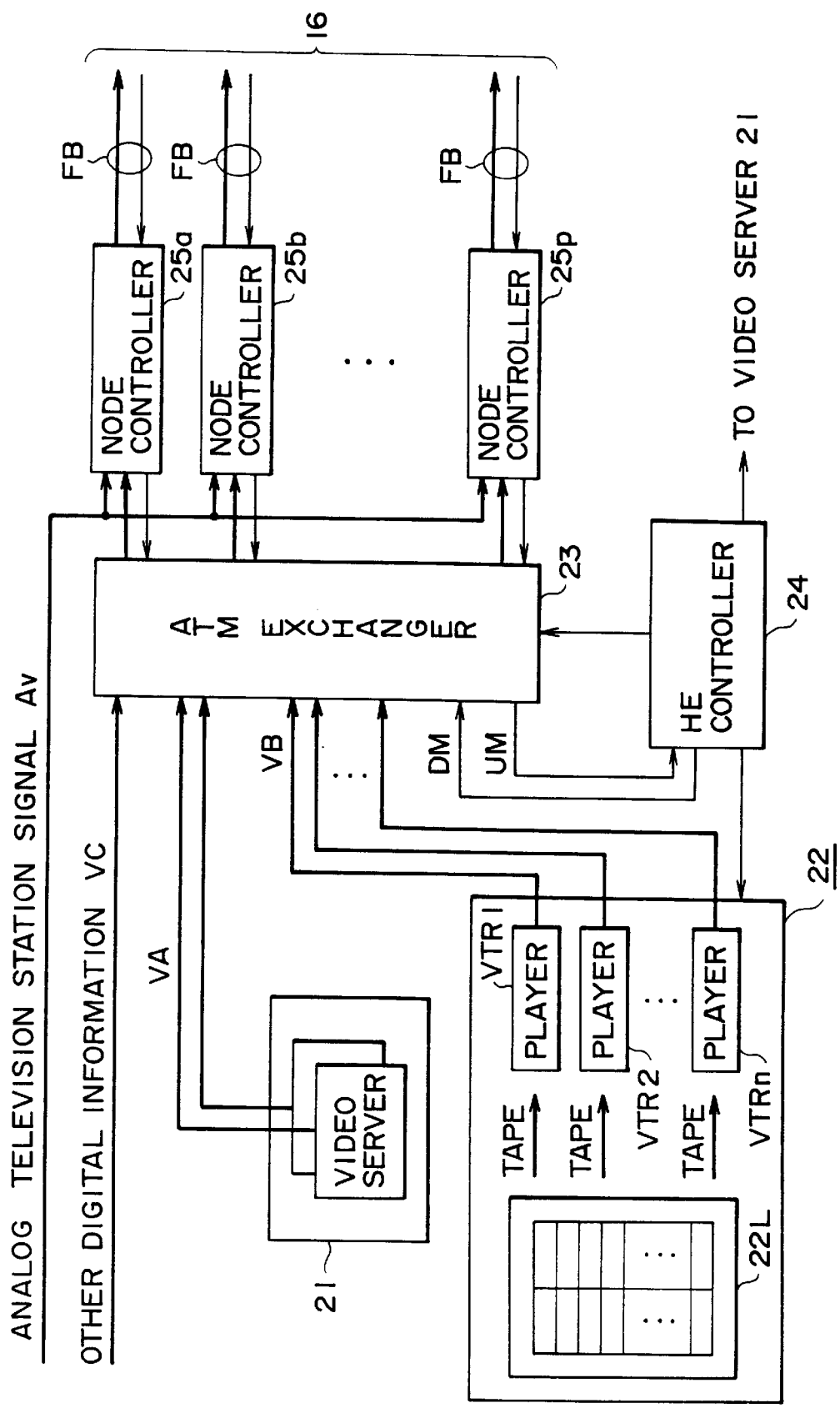

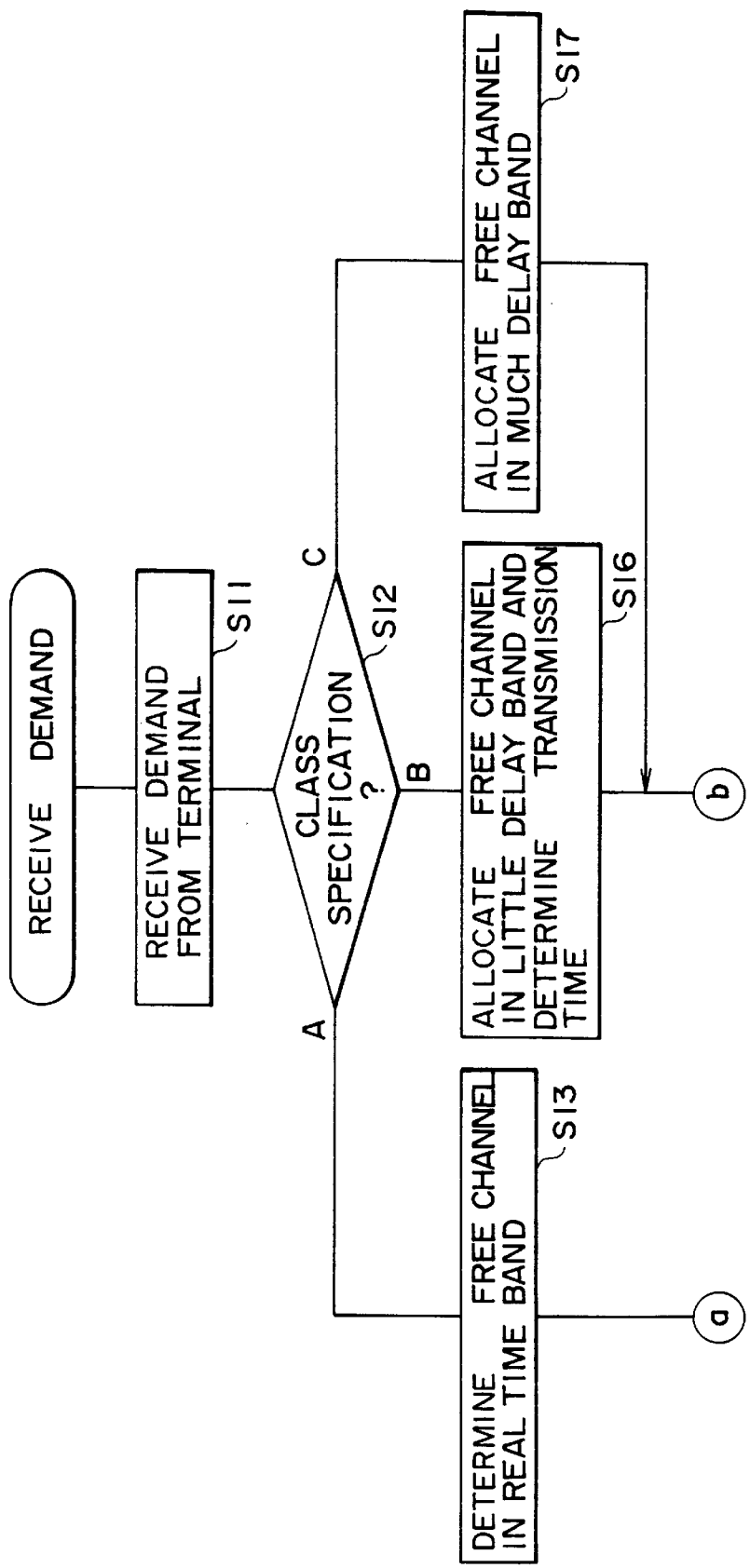

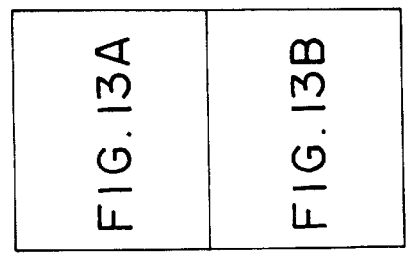
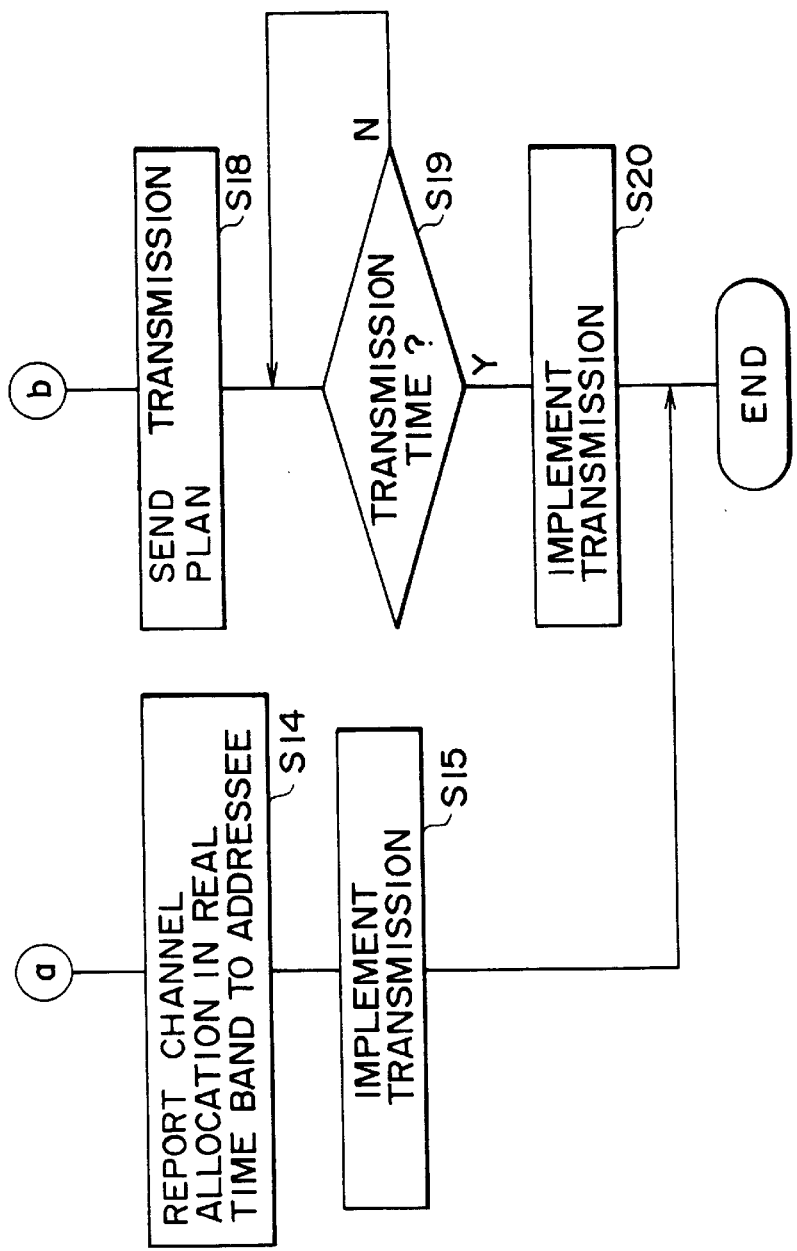

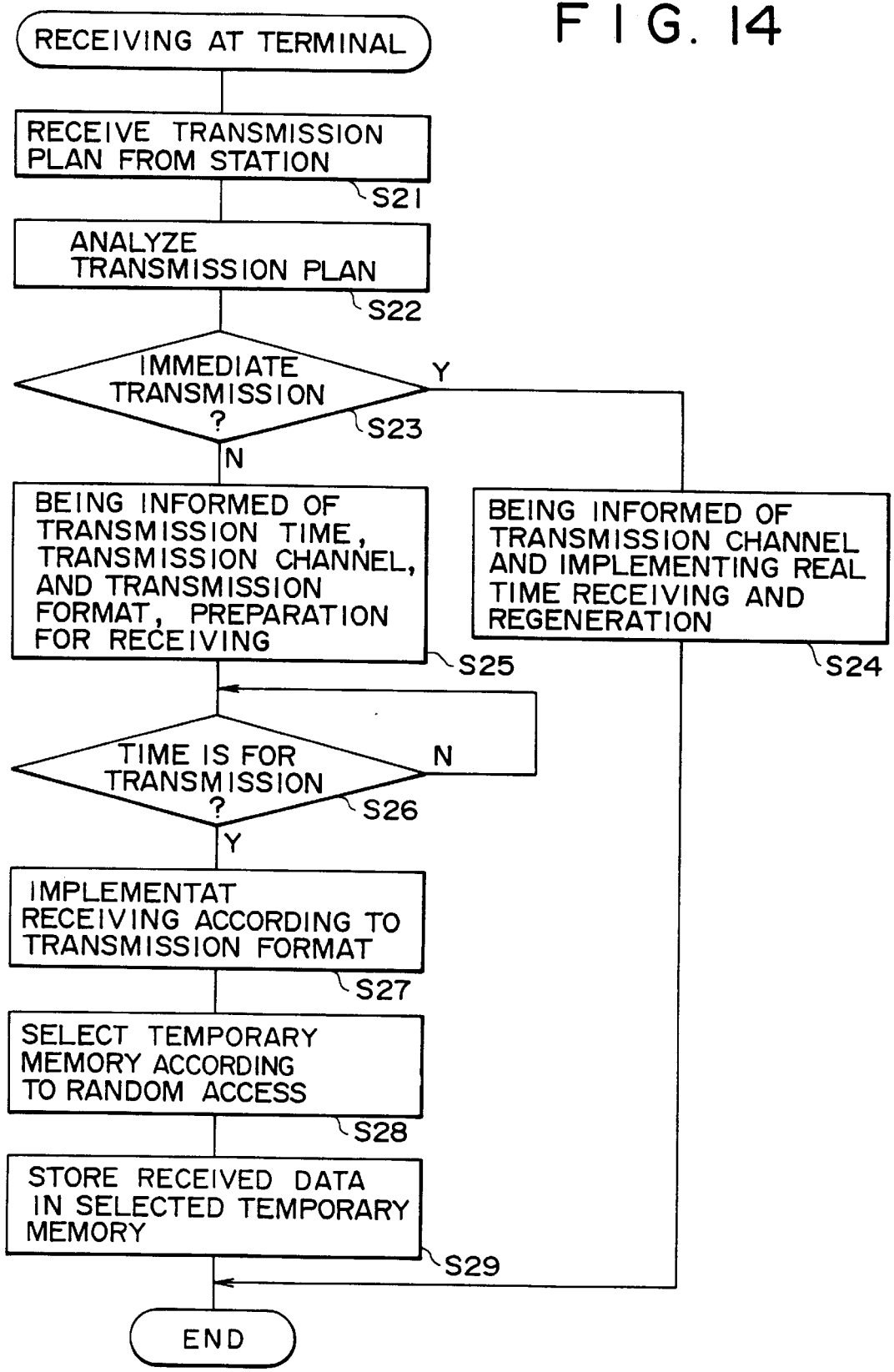

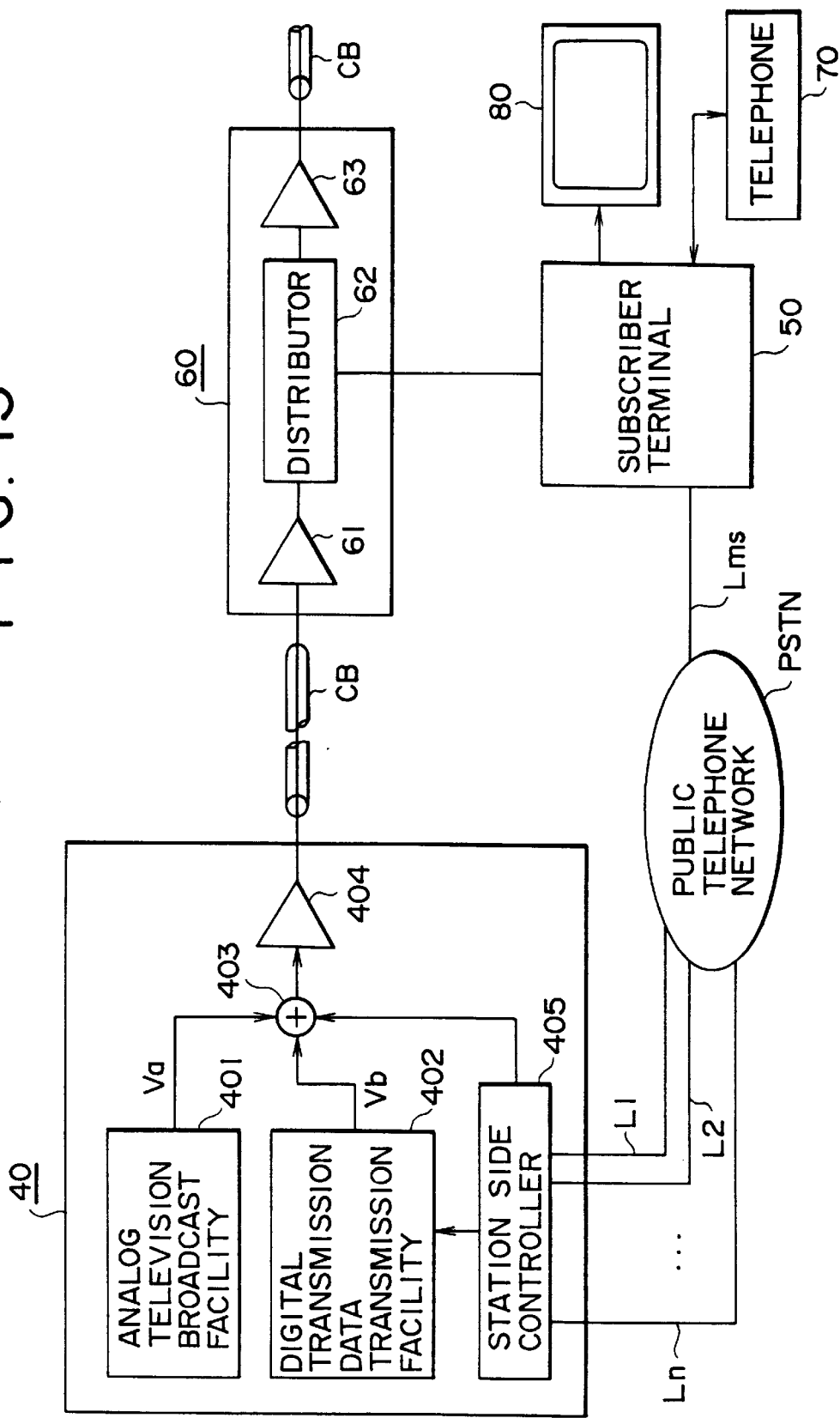

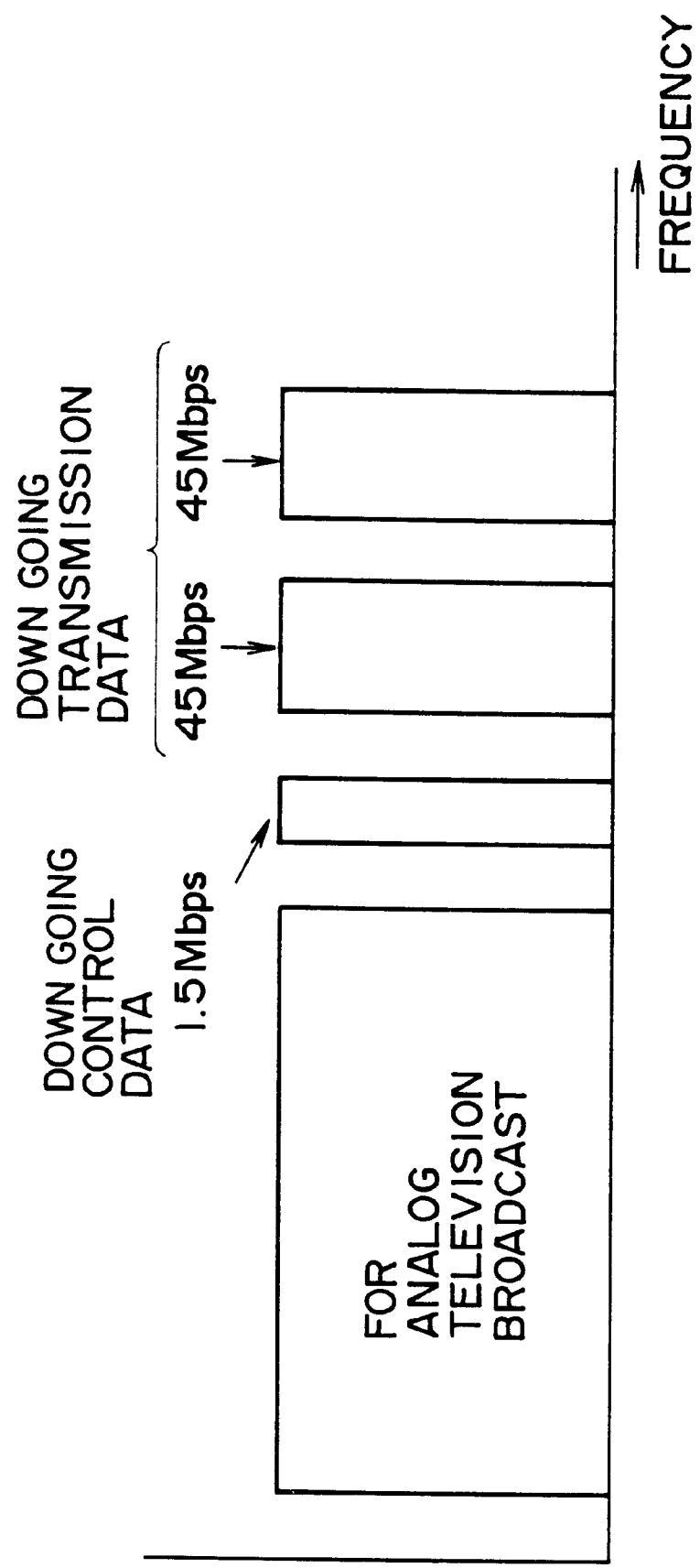

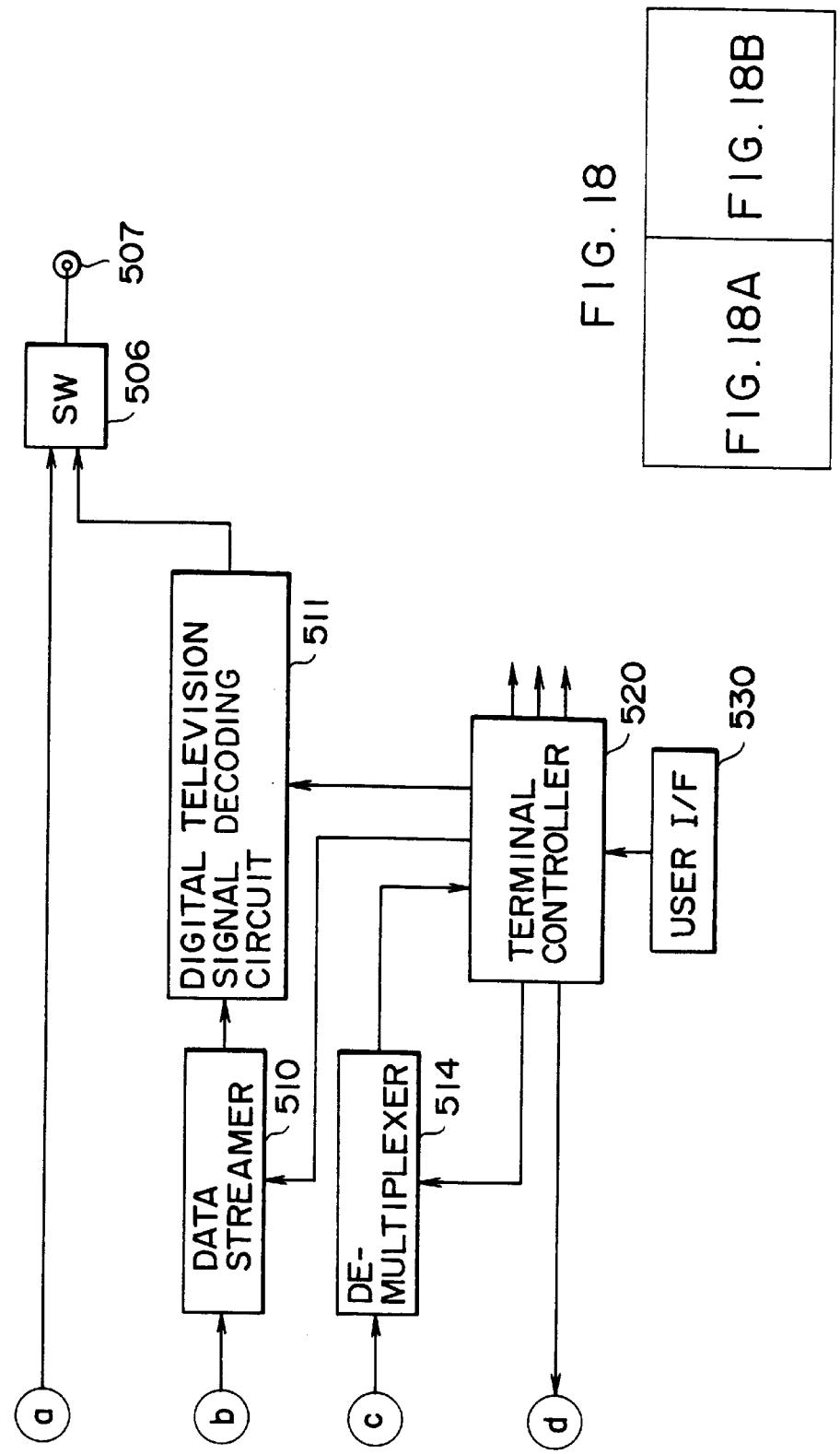

5,943,047

TWO-WAY INFORMATION TRANSMISSION SYSTEM, TWO-WAY INFORMATION TRANSMISSION METHOD AND SUBSCRIBER TERMINAL DEVICE

BACKGROUND OF THE INVENTION

1. Field of the Invention

This invention relates to a two-way information transmission system such as video on-demand system and information on-demand system using a communication network such as cable television network.

2. Description of Related Art

Not only usual analog broadcasting service but also video on-demand, home shopping, and television game service utilizing a two-way cable television network have been recently planned.

One method for realizing such services is a method in which a digital information transmission band is provided, for example, in the transmission band of the television network separately from the band for analog broadcasting service. In detail, for example in the case of video on-demand system, a user transmits a demand signal (transmission request signal) of the video on-demand to a cable television station where a video program storing sending system called video server is installed using a portion of the digital information transmission band. Upon receiving the demand signal from the user, the cable television station takes out the program requested by the user from the video server, and provides it to the requesting user in real time using a band other than that for the above-mentioned demand signal in the above-mentioned digital information transmission band.

One of such video on-demand systems is introduced in a journal "Nikkei Electronics" issued May 23, 1994 on pages 82 to 89.

This example involves a hybrid network system comprising combined optical fiber and coaxial cable, the optical fiber connects from the cable television station to an optical fiber node, the optical fiber node performs photoelectric conversion, and the coaxial cable connects from the optical fiber node to a subscriber terminal called as set top box installed in the user home. Assuming that 16 optical fiber nodes are provided and the maximum number of subscribers connectable to a coaxial cable is 500, then one cable television station can supply to 8000 subscribers.

In assignment of transmission band of the cable television, This video on-demand system assigns the band range from 50 MHz to 723 MHz to a transmission band for going-down from the cable television station to a subscriber terminal of a subscriber, and the band range from 900 MHz to 1 GHz to a transmission band for going-up from a subscriber terminal to the cable television station, further, a transmission band between 50 MHz to 450 MHz out of the going-down transmission band is used for the existing analog broadcasting service and a transmission band between 500 MHz to 708 MHz is used for digital transmission band. and the residual transmission band ranging from 450 MHz to 500 MHz is spare as shown in FIG. 1

At most 15 digital transmission channels with a band width of 12 MHz can be provided in the digital information transmission band ranging from 500 MHz to 708 MHz. Assuming that the transmission speed per one channel is 45 M bits/sec and, for example, the coding speed of video data is 4 M bits/sec, video data can be supplied to about 10 subscribers by way of a channel with the transmission speed of 45 M bits/sec in real time.

Assuming that the proportion of requesting subscribers for demand to 500 subscribers is 25% in the busy time called as prime time, it is required to supply to 125 subscribers, and one channel can supply to 10 subscribers, therefore 15 channels can supply to 150 subscribers and thus the requirement is satisfied.

In the case of this example, the control channel is assigned near the frequency of 500 MHz, and the going-down channel to be used for supplying a video program data desired by a user through demand is informed to the set top box using this control channel. The set top box fetches only a desired going-down data in the cable television station based on the data of the control channel, and functions to display it on a television. The transmission speed of the control channel is 1.5 M bits/sec, and 45 channels and 1 channel are for going-up and for going down respectively.

FIG. 2 shows how the transmission capacity of going-down line is allocated to respective subscribers, the left half of the figure shows so-called prime time and the right half shows the midnight time zone.

In FIG. 2, the top half shows the transmission channels for analog television broadcasting service, each long rectangle represents one analog television program PGa. In this case, 50 channels of analog television broadcasting service are possible to be transmitted if one channel has a band width of 6 MHz. Each subscriber can select and view a desired program from programs being broadcasted by way of analog channels any time.

The bottom half of FIG. 2 shows the digital information channels for video on-demand, an arrow Tdm represents a demand generating time point from a user, and a long rectangle represents a one digital video program PGd. In response to a demand from a user, one channel is occupied by the user for a time of the service.

In FIG. 2, rating is high for the analog broadcasting program and also demand generation rating is high for the digital video program in prime time, on the other hand, rating is low for the analog broadcasting program and also demand generation rating is low for the digital video program in midnight.

As described hereinabove, in the conventional video on-demand system, video programs are supplied in real time to all the demands. Therefore, in the time zone like so-called prime time when many demands are requested from subscribers, many programs should be transmitted at a time as shown in the left side of FIG. 2.

For construction of a video on-demand system, the network capacity and transmission system are deployed so that programs are supplied to subscriber homes as soon as possible in real time in the busiest time zone when many demands are requested.

To cope with such situation, the conventional system is involved in a problem that ① the network capacity should be large, and ② the scale of video server should be large in order to supply many programs simultaneously (for example, assuming the number of subscribers is 8000 and 25% of these subscribers request their demand in prime time, the simultaneous transmission stream are 2000 streams). The capacity investment for enlargement of an existing facility is required, and an expensive large scale video server should be introduced, these expenditure can render the business substantially unprofitable.

As described herein above, many demands are generated very frequently in prime time, on the other hand, a few demand is generated sporadically in the time zone of early morning and midnight, the problem is inefficient use of the network facility having a large capacity deployed so as to match with busy demand in prime time, the capacity utilization ratio is low.

Further, the change of a cable television facility from existing one-way system to the above-mentioned two-way system requires the large scale replacement of infrastructure due to the above-mentioned problem, the expenditure for such investment is also very heavy and a problem.

It is the object of the present invention to provide a two-way information transmission system for solving problems described herein above.

SUMMARY OF THE INVENTION

In order to solve the above-mentioned problem, the two-way information transmission system of the present invention is provided with; an information distribution transmission center and a plurality of subscriber terminals connected to the information distribution transmission center through going-up lines and going-down lines, in which the subscriber terminal requests an information to the information distribution transmission center through the going-up line, and the information distribution transmission center transmits the requested information in response to the request for the transmission; the information distribution transmission center having; transmission planning means for planning a transmission plan to transmit the information based on an information distribution transmission request from the subscriber terminal, transmission implementation means for implementing the transmission of the requested information based on the transmission plan planned by the transmission planning means, and going-down control data sending means for sending a going-down control data including an information involving the transmission implementation plan planned by the transmission implementation means to the subscriber terminal which sent the information distribution transmission request before the transmission implementation means implements the transmission, the subscriber terminal having; distribution transmission request sending means for sending the information distribution transmission request including at least information for identifying the demand subscriber terminal, information for identifying the requested information, and information relating to urgency of the requested information, memory means, transmission plan receiving analysis means for being informed of the transmission plan based on the going-down control data from the information distribution transmission center, information acquisition means for acquiring the information transmitted from the information distribution transmission center based on the transmission plan and storing it in the memory means, which information was acquired by the transmission plan receiving analysis means, and reading means for reading the information from the memory means.

In the two-way information transmission system of the present invention having the structure described herein above, the information distribution transmission center transmits the information to a subscriber terminal either in real time or at a desired delayed time dependently on a transmission plan planned based on the information of the information use time desired by the subscriber included in the transmission request from the subscriber terminal. The subscriber terminal stores the transmitted information in the memory means with a large capacity, and reads the information at the desired time for use.

Not all the transmission for transmission requests is real time transmission, therefore, the number of immediate real time transmissions is not so many, the reduced real time transmission allows the transmission facility scale to be small. The centralization of the traffic in prime time zone is prevented and the transmission capacity can be used efficiently.

BRIEF DESCRIPTION OF THE DRAWINGS

FIG. 1 is a diagram for describing an example of transmission frequency band assignment in a two-way information transmission system.

FIG. 2 is a diagram for illustrating the use of going-down information transmission channels in the conventional video on-demand system.

FIG. 3 is a diagram for illustrating an example of a network structure of one embodiment of the two-way information transmission system in accordance with the present invention.

FIG. 4 is a diagram for illustrating an example of a cable television station structure as an information transmission center in one embodiment of the two-way information transmission system in accordance with the present invention.

FIG. 13 is a flow chart for describing an example of demand receiving processing in a cable television station in one embodiment of the two-way information transmission system in accordance with the present invention.

FIG. 14 is a flow chart for describing an example of receiving processing of going-down digital transmission data at a subscriber terminal in one embodiment of the two-way information transmission system in accordance with the present invention.

FIG. 15 is a diagram for describing an example of the network structure in another embodiment of the two-way information transmission system in accordance with the present invention.

FIG. 16 is a diagram for describing an example of transmission frequency band assignment in another embodiment of the two-way information transmission system in accordance with the present invention.

DETAILED DESCRIPTION OF THE PREFERRED EMBODIMENTS

Figure 5A:
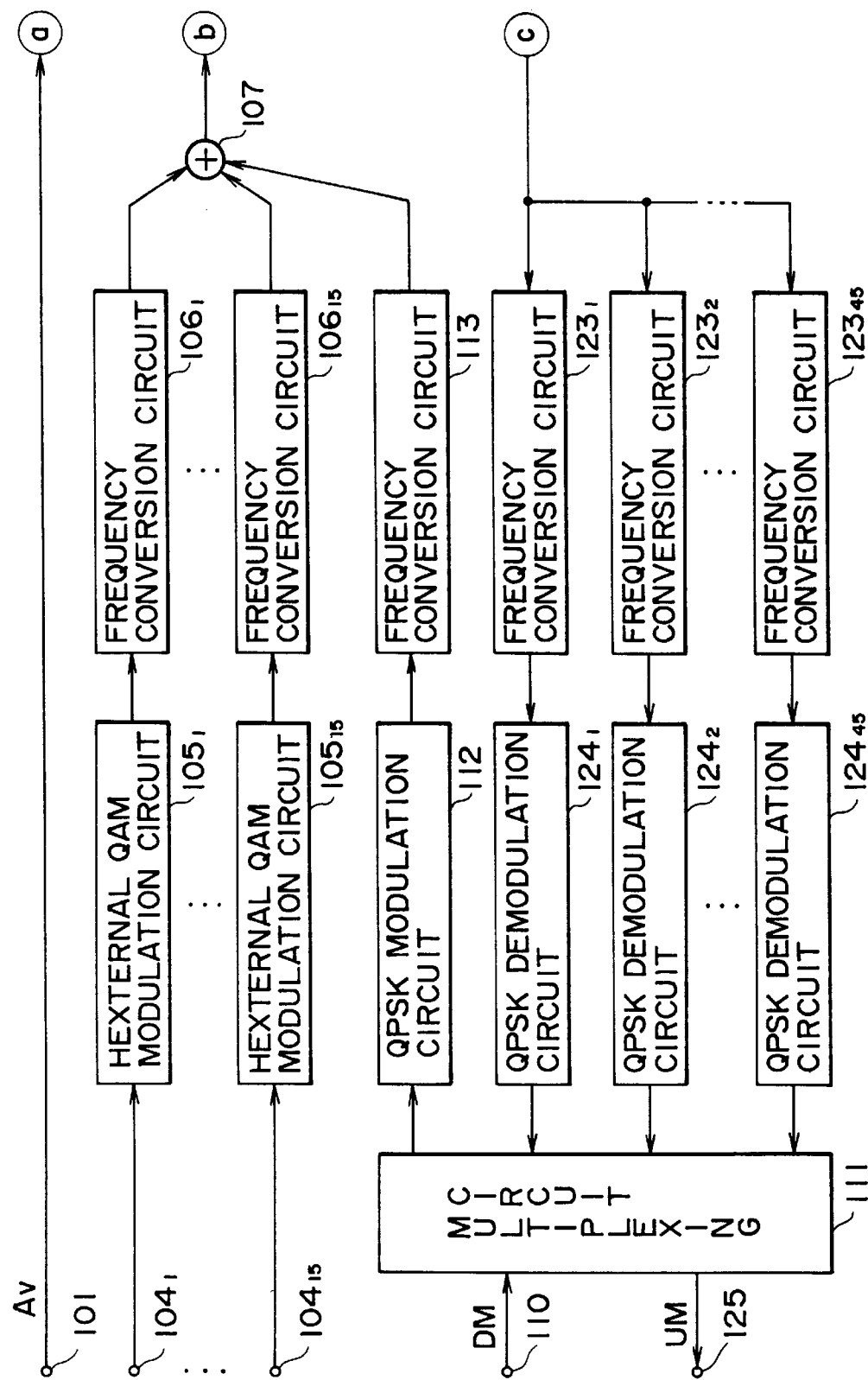
FIG. 5 is a block diagram for illustrating a partial structure of the cable television station facility shown in FIG. 4.
Figure 5B:
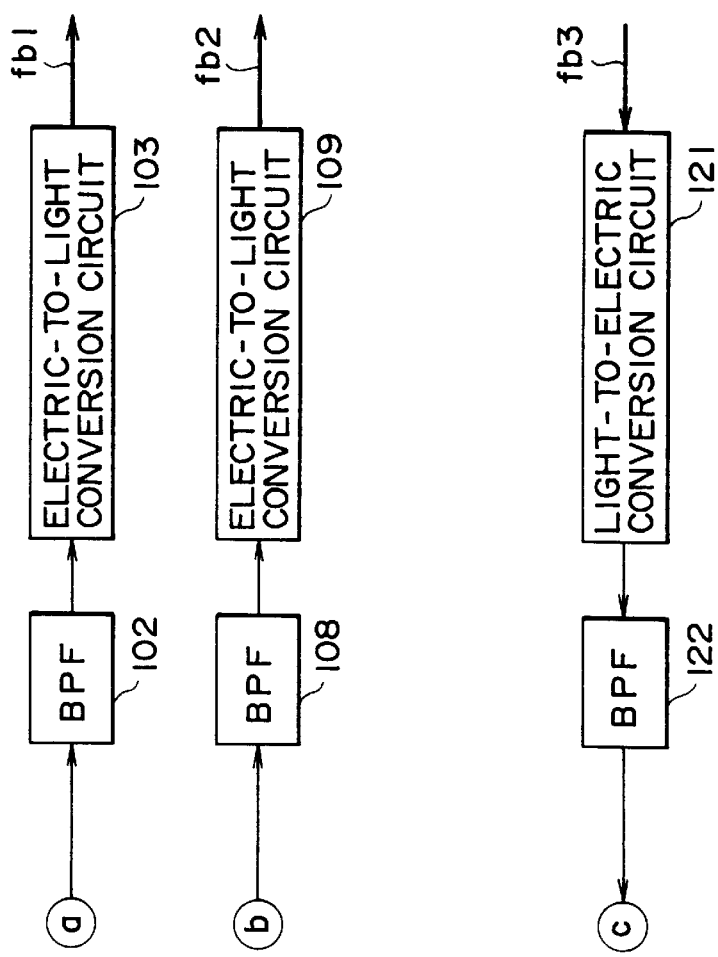

Embodiments of the two-way information transmission system in accordance with the present invention will be described in detail referring to the drawings for the example of video on-demand system. The direction from a subscriber to a cable television station is referred to as going-up, and the inverse direction is referred to as going-down in the description hereinafter.

FIG. 3 shows the outline of a network structure used for realizing a video on-demand of an embodiment of the two-way information transmission system. This example has the same structure as that of the two-way cable television system described in the chapter of related art.

The cable television station HE called head end provides analog television broadcast programs always during the broadcasting time zone and also video programs in response to the demand from subscribers and other programs.

The cable television station HE can cover, for example, 8000 subscribers as described herein above, 8000 subscribers are divided into 16 sections and each section covers 500 subscribers MS. One interchange equipment IM called as optical fiber node (referred to as optical fiber node IM hereinafter) is installed for each section. An optical fiber node IM performs mutual conversion between optical signal and electric signal.

In the case of this embodiment, an optical fiber cable FB connects between each section and the television station HE in order to transmit a signal without degrading in quality across a long distance. In each section, one coaxial cable CB is connected to an optical fiber node IM, and each subscriber MS is connected to the coaxial cable through a coaxial confluent distributor MPX. At most 500 subscribers MS are connectable to one coaxial cable CB as described hereinbefore.

The cable television station HE has information sources including video server, and is connected to an optical fiber trunk SHW in order to fetch digital information from the optical fiber trunk SHW and provide it to the subscribers in addition to digital data from the digital information source of the cable television station HE itself. Further, a parabola antenna AT is provided for receiving satellite broadcast, and received television broadcast is supplied to respective subscribers as analog television broadcast.

FIG. 4 shows an example of facility components of the cable television station HE, and in this example, the facility comprises the above-mentioned analog television broadcasting facility not shown in FIG. 4, for example video server 21 and tape information library system 22 as a digital information source equipment, high speed ATM (non-synchronous transfer mode) exchanger 23, HE controller 24 for controlling the whole system of the cable television station HE, and 16 node controllers 25a to 25p provided between 16 respective optical fiber cables FB and ATM exchangers.

In this example, the video server 21 obtains, for example, 400 streams as a bit stream of simultaneous transmission video signal. The coding rate of each bit stream data is, for example, 4 Mbits/sec, and, for example, MPEG is used as a data compression system. In this case, two video servers may be provided as the video server 21 if, for example, simultaneous transmission stream quantity is 200 streams. Data VA of each video stream from the video server 21 is supplied to ATM exchanger 23.

The tape information library system 22 is provided with a multi-shelf container rack 22L in which many video tapes are placed on respectively specified positions, a plurality of video tape players VRT1 to VTRn, and a retrieving transferring mechanism (not shown in the figure) which is successively operated for retrieving in the horizontal and vertical direction to find out the position of a requested video tape in the container rack 22L, for fetching the video tape, setting the video tape into any one of video tape players VTR1 to VTRn to playback the video tape, such tape information library system 22 is so-called as cart machine. In this example, 160 video tape players are deployed. Therefore, the number of bit streams of the simultaneous transmission video signal is 160.

Data VB of the digital video data stream of respective video tape players VTR1 to VTRn has a transmission rate of, for example, 45 Mbits/sec. The data VB is supplied to the ATM exchanger.

The tape information library system 22 provides programs more and easier than the video server 21.

The HE controller 24 controls the whole cable television station HE including the control of the video server 21, control of the tape information library system 22, and control of the ATM exchanger 23, generates a going-down control data DM to be transmitted to a subscriber and supplies it to the ATM exchanger 23 in response to an operation input from an operator to the HE controller 24 and a going-up control data UM (data such as a demand signal of the video on-demand) from a subscriber terminal supplied through the ATM exchanger 23.

Also digital data VC obtained from the optical fiber trunk SHW is supplied to the ATM exchanger 23.

The ATM exchanger 23 exchanges the above-mentioned digital data VA, VB, and VC, and going-down control data DM and divides or gathers them to generate information necessary for respective transmission sections. The ATM exchanger 23 also transfers a going-up control data UM from a subscriber terminal to the HE controller 24.

Respective 16 node controllers 25a to 25p receive the analog television broadcast signal AV and going-down information from the ATM exchanger 23, and converts them to a signal having the frequency band previously assigned and converts an electric signal to light signal, and send it to the optical fiber FB as described in FIG. 1. The respective 16 node controllers 25a to 25p convert a going-up control data UM from a light signal to electric signal, and transfer it to the ATM exchanger 23.

Figure 5:
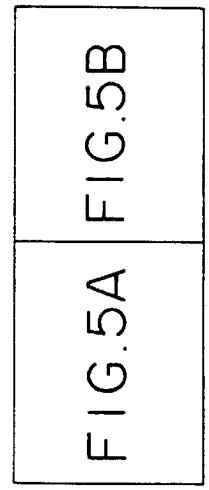

Every node controllers 25a to 25p have the same structure. FIG. 5 is a block diagram for illustrating the structure of one node controller out of the node controllers 25a to 25p. The optical fiber FB comprises three optical fibers fb1, fb2, and fb3.

The analog television information AV is supplied to a band pass filter 102 through an input terminal 101, and converted to information having a frequency band of 50 MHz to 450 MHz, and supplied to the electric-to-light converter 103.

The analog television information Av is supplied to the band pass filter 102, converted to an information having a frequency of 50 MHz to 450 MHz, and supplied to the electric-to-light converter 103. The electric-to-light converter 103 converts it to a light signal and sends it to the optical fiber fb1.

In this example, as shown in the above-mentioned FIG. 1, 15 channels are allocated for the going-down digital transmission data of 45 M bits/sec per one channel. Therefore, the node controller has 15 digital transmission data input terminals $104_1$ to $104_{15}$. The ATM exchanger 23 switches directly the digital data such as video stream from the tape information library system 22 to any one of 15 input terminals $104_1$, to $104_{15}$ of a node controller corresponding to the section of the addressee subscriber.

The ATM exchanger 23 switches a digital data of 4 M bits/sec bit stream from the video server 21 in a manner that at most 10 streams are multiplexed and allocated to one channel.

Respective 45 M bits/sec digital data transmitted through the input terminals 1041 to 10415 are supplied to hexternal QAM (Quadrature Amplitude Modulation) modulation circuits $105_1$, to $105_{15}$ respectively and modulated. The output data from the hexternal QAM modulation circuits $105_1$, to $105_{15}$ are converted by the frequency conversion circuits $106_1$, to $106_{15}$ respectively to signals of 15 channels which are signals of 15 frequency bands with no superposing each other in the frequency band ranging from 500 MHz to 708 MHz as shown in FIG. 1. The output data from the frequency conversion circuits $106_1$ to $106_{15}$ are supplied to the adding circuit 107 and the frequency of the data is converted.

A node controller has an input terminal 110 for receiving 1.5 M bits/sec going-down control data DM of one channel. The control data DM which passed through the input terminal 110 is supplied to QPSK (Quadrature Phase Shift Keying) modulation circuit 112 through the multiplexing circuit 111, and subjected to QPSK modulation, and then supplied to a frequency conversion circuit 113 and converted to a signal of the going-down control channel near 500 MHz shown in FIG. 1. Subsequently, the signal is supplied to the adding circuit 107 and subjected to frequency multiplexing.

The frequency multiplexed data from the adding circuit 107 is supplied to the band pass filter 108 and subjected to band restriction to a signal in a frequency band ranging from 500 MHz to 708 MHz, and supplied to the electric-to-light converter 109. The electric-to-light converter 109 converts it to a light signal, and sends it to the optical fiber fb2 as a digital transmission data.

The optical fiber fb3 is used for the going-up control channel, a going-up control signal such as a demand of a subscriber which is QPSK modulated and includes 45 channels by frequency multiplexing is supplied to a light-to-electric converter 121 through the optical fiber fb3, and the signal is converted from a light signal to an electric signal. The output signal from the light to-electric converter 121 is supplied to a band pass filter 122 and subjected to the band restriction, and then only the going-up control data having a frequency band ranging from 900 MHz to 972 MHz is fetched.

The control data from the band pass filter is supplied to 45 frequency conversion circuits $123_1$ to $123_{45}$ corresponding to frequency bands of 45 channels and subjected to frequency conversion, the frequency converted data are processed as modulation data for respective channels. The modulation data for each channel from the frequency conversion circuits $123_1$ to $123_{45}$ is demodulated in a QPSK demodulation circuit $124_1$ to $124_{45}$ to a control data of 1.5 M bits/sec. The control data is subjected to time slicing multiplexing in the multiplexing circuit 111, and it is sent to the ATM exchanger 23 through an output terminal 125 as a going-up control data UM.

Figure 6:
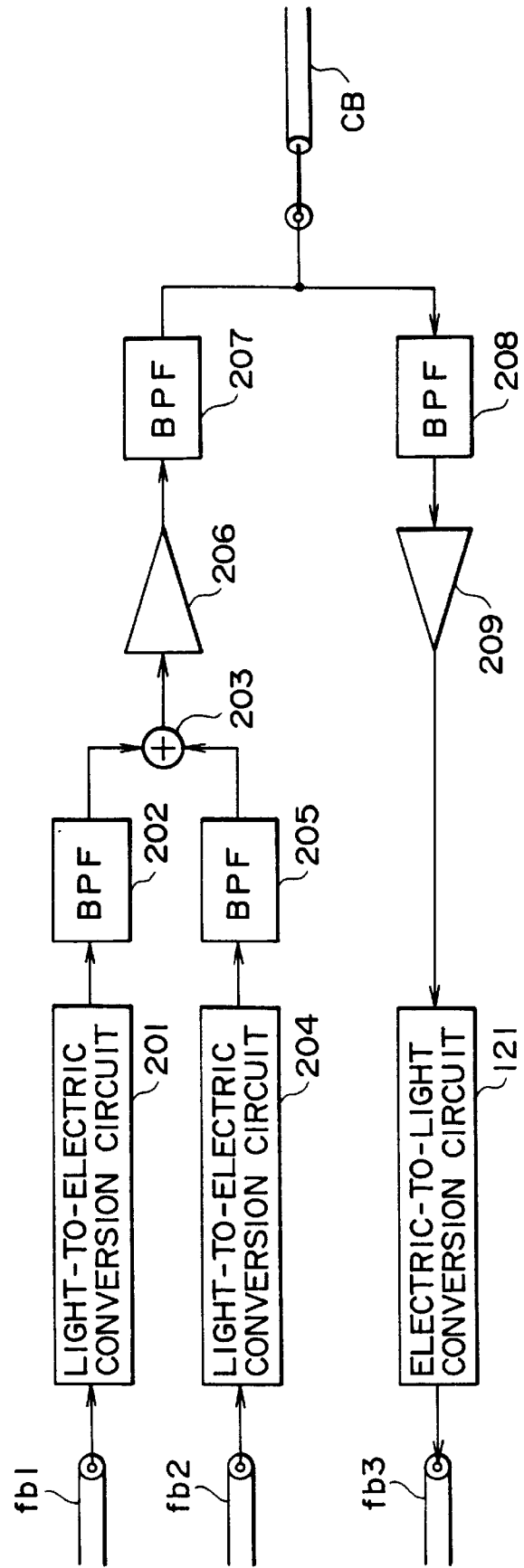
FIG. 6 is a block diagram for illustrating an interchanging equipment in one embodiment of the two-way information transmission system in accordance with the present invention.

Next, the structure of the optical fiber node IM is described. FIG. 6 is a block diagram of an example of an optical fiber node.

A light-to-electric converter 201 receives an analog television signal through the optical fiber fb1for the analog television broadcast line and converts it to an electric signal, thereafter supplies it to a band pass filter 202. The band pass filter 202 fetches only an analog television signal in a frequency band ranging from 50 MHz to 450 MHz from the input signal, and supplies it to an adding circuit 203.

A light-to-electric converter 204 receives a going-down digital transmission data of 15 channels through the optical fiber fb2 and converts it to an electric signal, and supplies it to a band pass filter 205. The band pass filter 205 fetches only a digital transmission data in a frequency band ranging from 500 MHz to 708 MHz from the input data, and supplies it to the adding circuit 203.

The adding circuit 203 adds the analog television broadcast signal and digital transmission data for frequency multiplexing, and supplies the frequency multiplexed signal to a band pass filter 207 through an amplifier 206. The band pass filter 207 performs band restriction within 50 MHz to 708 MHz frequency band on the input signal, and thereafter sends the frequency multiplexed signal to the coaxial cable CB.

A data sent from a subscriber terminal through the coaxial cable CB is supplied to a band pass filter 208. The band pass filter 208 performs band restriction within 900 MHz to 972 MHz on the input data and fetches a going-up control data, and supplies it to an electric-to-light converter 210 through an amplifier 209. The electric-to-light converter 210 converts the going-up control data to an light signal and sends it to the optical fiber fb3.

Figure 7:
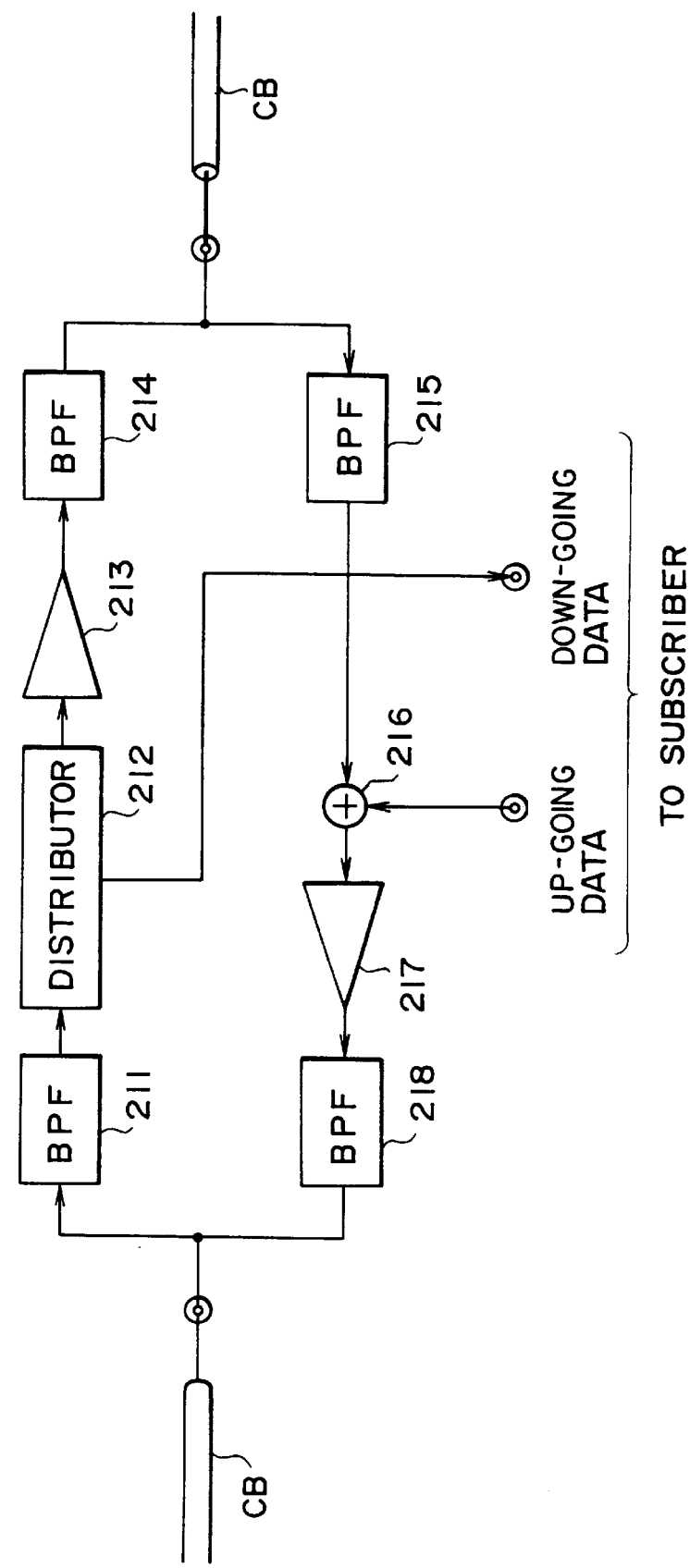
FIG. 7 is a block diagram for illustrating an interchanging equipment in one embodiment of the two-way information transmission system in accordance with the present invention.

Next, a structural example of a coaxial confluent distributor MPX is described referring to FIG. 7. In detail, a going-down line data from the coaxial cable CB of the optical fiber node IM side is supplied to a band pass filter 211. The band pass filter 211 performs band restriction on the input signal within a band ranging from 50 MHz to 708 MHz, and supplies it to a distributor 212.

The distributor 212 supplies the going-down line data to a subscriber terminal connected to the coaxial confluent distributor MPX. Also, the distributor 212 supplies the going-down line data to a band pass filter 214 through an amplifier 213. The band pass filter 214 performs band restriction on the going-down line data for down-stream subscribers within a frequency band ranging from 50 MHz to 708 MHz, and sends it to the coaxial cable CB.

A data from the down-stream side coaxial cable CB is supplied to a band pass filter 215. The band pass filter 215 performs band restriction on the input data within a frequency band ranging from 900 MHz to 972 MHz to allow the going-up control data to pass, and supplies it to a synthesis circuit 216. The synthesis circuit 216 adds the going-up control data from down-stream subscribers and the going-up control data from the subscriber connected to the coaxial confluent distributor MPX, and supplies the synthesized data to a band pass filter 218 through an amplifier 217. The band pass filter 218 performs band restriction on the input data within a frequency band ranging from 900 MHz to 972 MHz and sends it to the up-stream coaxial cable CB.

The frequency band for control data of respective subscribers is previously assigned so as not to overlap each other in one section.

Figure 8:
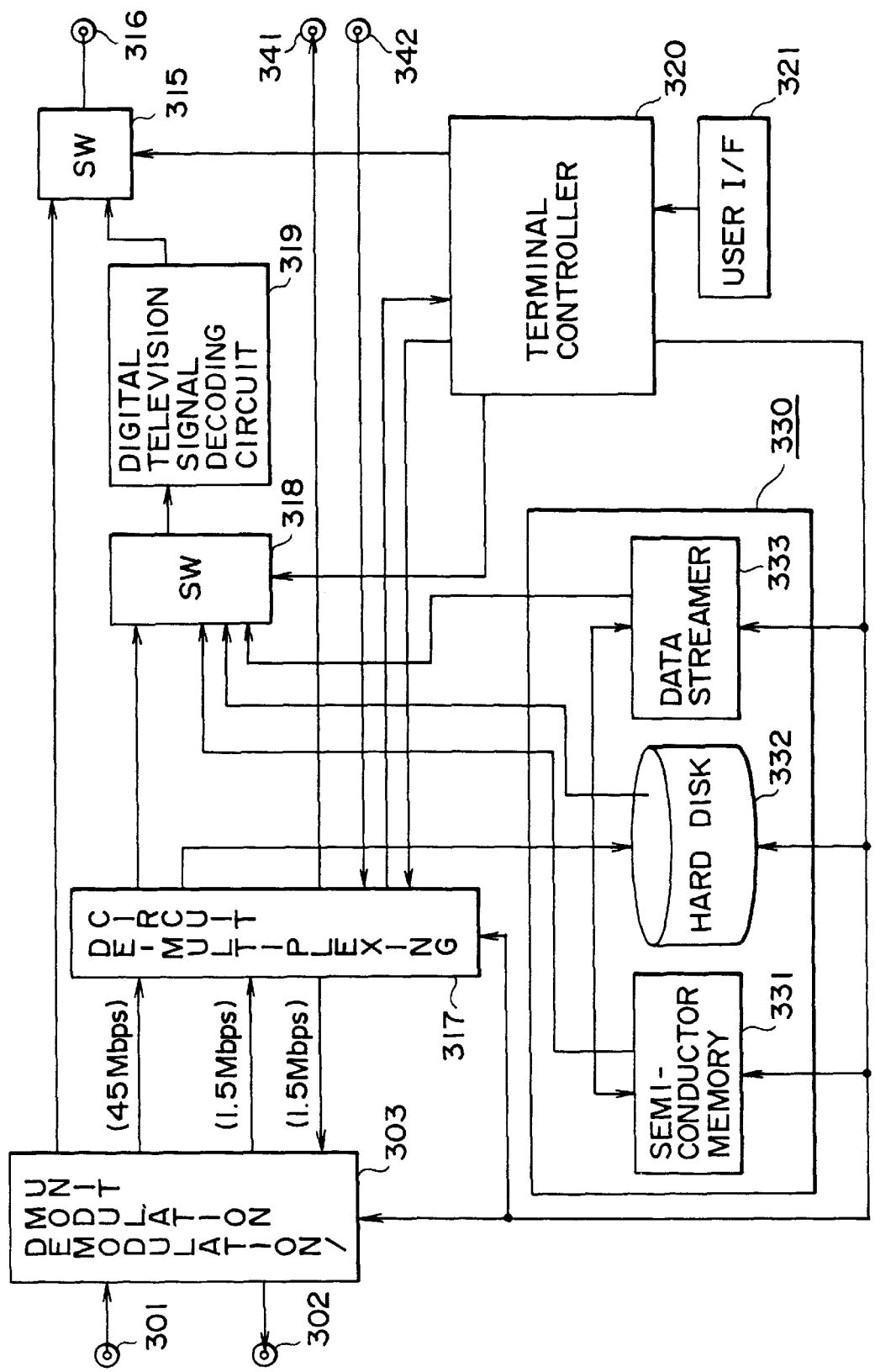
FIG. 8 is a block diagram for illustrating a structural example of a subscriber terminal in one embodiment of the two-way information transmission system in accordance with the present invention.
Figure 9:
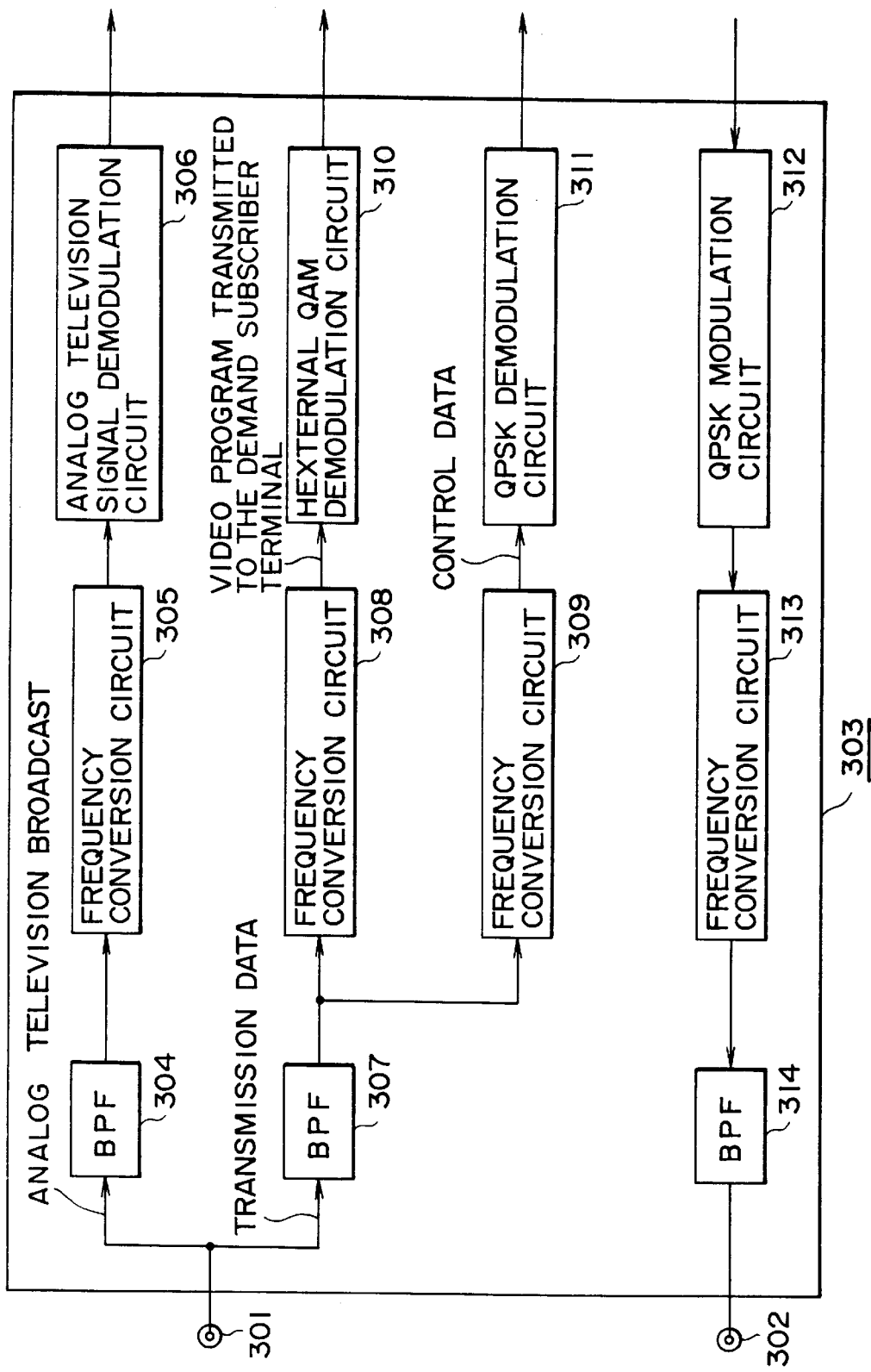
FIG. 9 is a block diagram for illustrating a partial structure of the subscriber terminal shown in FIG. 8.
Figure 10:
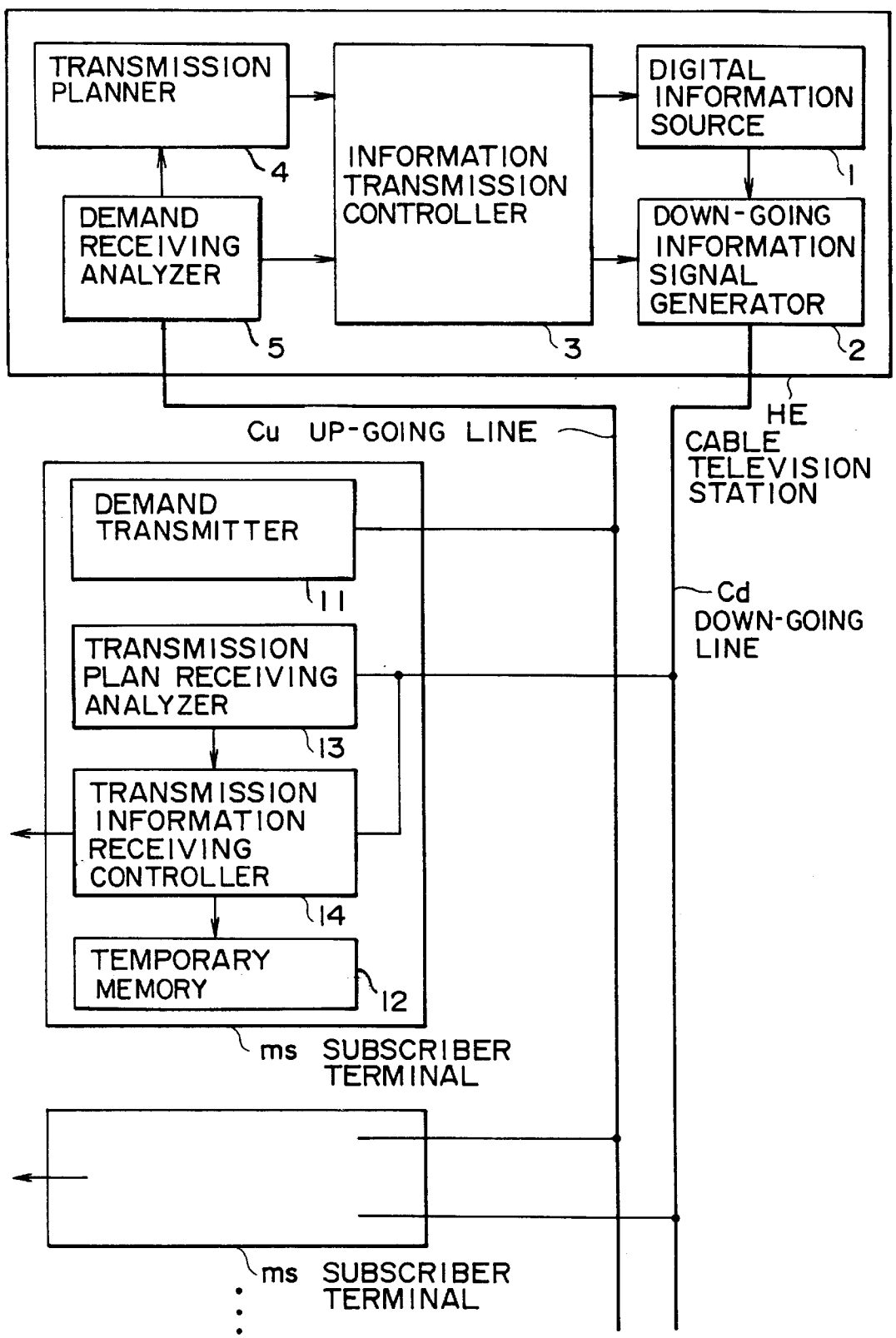
FIG. 10 is a functional block diagram of a selected portion for illustrating one embodiment of the two-way information transmission system in accordance with the present invention.

Next, a structural example of a subscriber terminal ms provided in a subscriber's house MS is described referring to FIG. 8 and FIG. 9.

In detail, a going-down channel data from the coaxial confluent distributor MPX is fed to an input terminal 301. A going-up control data is sent from an output terminal 302 to the coaxial confluent distributor MPX. The coaxial input terminal 301 and coaxial output terminal 302 are connected to a demodulation/modulation unit.

The demodulation/modulation unit 303 has the structure shown in FIG. 9. In detail, a going-down line data from the coaxial input terminal is supplied to a band pass filter 304. The band pass filter 304 extracts an analog television broadcast signal in a frequency band ranging from 50 MHz to 450 MHz and supplies it to a frequency conversion circuit 305.

The frequency conversion circuit 305, which corresponds to a mixer circuit of a tuner, converts a signal of the broadcast program (broadcast channel) selected by a user out of received analog television broadcast signals to a signal having a frequency which can be demodulated by a subsequent analog television demodulation circuit 306 in response to a channel select control signal corresponding to a channel select operation of the user supplied from a terminal controller 320 described hereinafter, and supplies it to an analog television demodulation circuit 306. The demodulation circuit 306 supplies the demodulated television signal to a television through a switch circuit 315 and video output terminal 316 shown in FIG. 8.

Further, a going-down line data from the coaxial input terminal 301 is supplied to a band pass filter 307. The band pass filter 307 extracts a going-down digital data having a frequency in the band ranging from 500 MHz to 708 MHz and supplies it to a frequency conversion circuit 308 and frequency conversion circuit 309.

The frequency conversion circuit 308 converts only the signal of the channel to which a video program delivered in response to the demand from the demand subscriber terminal based on a channel select control signal from the terminal controller 320 to a prescribed frequency which can be demodulated. A digital transmission data such as a video program data addressed to the demand subscriber terminal from the frequency conversion circuit 308 is supplied to a hexternal QAM demodulation circuit 310 and demodulated. The 45 M bits/sec digital data from the demodulation circuit 310 is supplied to the de-multiplexing circuit 317.

The frequency conversion circuit 309 frequency-converts the frequency of a control channel data assigned previously to the demand subscriber terminal to a frequency which can be demodulated based on a channel select control signal from the terminal controller 320. The going-down control data from the frequency conversion circuit 309 is supplied to a QPSK demodulation circuit 311 and demodulated. The 1.5 M bits/sec control data from the demodulation circuit 311 is supplied to the de-multiplexing circuit 317.

A QPSK modulation circuit 312 of the demodulation/ modulation unit 303 receives a going-up control data, which will be described hereinafter, through the de-multiplexing circuit 317, and modulates it, and supplies it to a frequency conversion circuit 313. The frequency conversion circuit 313 frequency-converts the frequency of the input signal to a frequency of the control channel assigned to the demand subscriber terminal in a frequency band ranging from 900 MHz to 972 MHz. The going-up control data from the frequency conversion circuit 313 is sent to the coaxial cable CB through a band pass filter 314 for band restriction in 900 MHz to 972 MHz and through the output terminal 302.

The de-multiplexing circuit 317 extracts a 4 M bits/sec digital transmission data addressed to the demand subscriber terminal from a 45 M bits/sec output data supplied from the hexternal QAM demodulation circuit 310 based on the control signal from the terminal controller 320 if the digital transmission data is a 4 M bits/sec immediate real time transmission data, and supplies it to a digital television signal decoding circuit 319 through a switch circuit 318.

The digital television signal decoding circuit 319 decodes the digital data and converts it to an analog television signal, and supplies the analog television signal to a television through the switch circuit 315 and video output terminal 316.

The de-multiplexing circuit 317 sends the digital transmission data which is to be transmitted to the demand subscriber terminal to the temporary memory means 330 and stores it temporarily in the case that the digital transmission data is a delaying transmission data referring to a control data from the terminal controller 320. In this case, the delaying transmission data may be 4 M bits/sec rate or 45 M bits/sec rate as described hereinafter.

A semiconductor memory 331 which is a data memory device having a large capacity (about 1 G bits) and high speed transmission rate, hard disk device 332 (about 10 G bits), or data streamer 333 (about 200 G bits) is used as the temporary memory means 330.

These temporary memory means 330 stores the digital transmission data from the multiplexing circuit 317 according to a memory command from the terminal controller 320, and reads a stored data according to the read command from the terminal controller and supplies the data to the digital television signal decoding circuit 319 through the switch circuit 318.

In this case, as described hereinafter, the terminal controller 320 determines which memory means is to be selected among the plurality of memory means of the temporary memory means 330 as the memory for storing the going-down digital data dependently on the random access potential and transmission format (such as data transmission rate) of the digital data to be stored which are specified by the going-down control data or determined by the demand sent by the demand subscriber terminal.

For example, if the data transmission rate is 4 M bits/sec and the data has a low random access potential such as usual video program, then the data is stored in the data streamer device 333 which uses tapes as the recording medium, on the other hand, if the data has high random access potential such as stock market information, then the data is stored in the hard disk device 332, and if the data is a transmission data with a data transmission rate of 45 M bits/sec, then the data is written in the semiconductor memory 331 capable of high speed writing, as described herein, the memory means in which a data is to be stored is controlled and selected.

The de-multiplexing circuit 317 supplies a going-down control data from the QPSK demodulation circuit 311 to the terminal controller 320 by controlling the terminal controller 320.

The terminal controller 320 analyzes the going-down control data fed to the terminal controller 320 through the de-multiplexing circuit 317, and if the control data is addressed to the demand subscriber terminal, the terminal controller 320 generates various control signals as described herein above based on the control data. For example, the terminal controller 320 acquires various information that when the video data demanded by the demand subscriber terminal will be transmitted by way of what channel out of 15 going-down channels in what transmission format, from the received going-down control data, and prepares for receiving. The channel select control signal to the frequency conversion circuit 308, the control signal for multiplexing to the multiplexing circuit 317, and the select control signal for selecting a memory device in the temporary memory device 330 which are described herein above are generated from this going-down control data.

Further, the terminal controller 320 receives an operational input by a user through a user interface 321 comprising a remote control device and key operation board, generates a going-up control data, namely demand signal of video on-demand, and supplies it to the de-multiplexing circuit 317. The terminal controller 320 controls the whole subscriber terminal ms.

A going-up control data such as video program demand sent from the terminal controller 320 to the de-multiplexing circuit 317 is supplied successively to the QPSK modulation circuit 312 of the demodulation/modulation unit 303, frequency conversion circuit 313, and band pass filter 314, modulated as described hereinbefore, frequency-converted to a signal of the control channel assigned to the demand subscriber terminal, and sent to the cable television station HE.

The de-multiplexing circuit 317 is connected to CATV telephone terminal (not shown in the figure) through the terminal 341 and 342, subscribers can communicate with operators of the cable television station HE.

The information transmission mechanism and transmission of a signal in the two-way CATV system having the system structure as described above are described hereinafter.

Analog Television Broadcast

Analog television broadcast is transmitted from the cable television station HE to subscriber terminals ms by way of one-way transmission as usual without demand from subscribers.

When a user wants to view an analog television broadcast from the cable television station HE, the user operates channel select operation for selecting an analog television broadcast of the cable television station HE through the user interface 321 of the subscriber terminal ms. Then, the terminal controller 320 of the subscriber terminal ms supplies a channel select signal corresponding to the channel select operation of the user to the frequency conversion circuit 305 of the demodulation/modulation unit 303, and the switch circuit 315 is switched to the mode for selecting an analog television signal from the analog television demodulation circuit 306 of the demodulation/modulation unit 303, and thereby an analog television signal is supplied from the video output terminal 316 to a television. Thus the subscriber can view an analog television broadcast program selected by the user from the cable television station.

Digital Information Transmission

FIG. 3 is a block diagram for describing mainly functions which are performed at the HE controller 24 of the cable television station HE and the terminal controller 320 of a subscriber terminal ms to transmit digital information in the system of the above-mentioned embodiment in which the cable television station HE and subscriber terminals ms are connected through the going-up and going-down lines comprising optical fiber and coaxial cable.

As shown in FIG. 3, the cable television station HE provided as an information distribution transmission center is connected to a plurality of subscriber terminals ms through the going-up line Cu which is the line for transmission toward the cable television station and the going-down line Cd.

The cable television station HE comprises functions of a digital information source 1 comprising a video server 21 and tape information library system 22, going-down information signal generator 2 comprising an ATM exchanger 23 and node controllers 25a to 25p, information transmission control means 3 for controlling a digital information source 1 and controlling a going-down information signal generator 2 to control transmission of an going-down digital information, transmission planning means 4, and demand receiving analysis means 5. The information transmission control means 3, transmission planning means 4, and analysis section of the demand receiving analysis means 5 are realized as functions of the HE controller 24 (realized by software).

Each subscriber terminal ms is provided with a demand transmission means 11 for sending a demand (transmission request) to the going-up line Cu, temporary memory means 12 having a large capacity, transmission plan receiving analysis means 13 for receiving a going-down control data addressed to the demand subscriber terminal and analyzing the transmission plan information, and transmission information receiving control means for receiving and demodulating a digital transmission data addressed to the demand subscriber terminal from the going-down line Cd and then supplying the modulated data to a monitor television not shown in the figure if the data is required to be regenerated in real time, or storing the received transmission information addressed to the demand subscriber terminal in the temporary memory means 12.

The demand transmission means 11 receives a demand of a user through the user interface such as a remote controller or key board, generates a distribution transmission signal, and sends it to the going-up line Cu.

A demand signal includes a user ID which is an identification code of each subscriber, transmission program specifying information (program identifying data) for specifying a video program requested for distribution, request time information which is a information relating to urgency of the requested information such as the time when the program is desired to be transmitted or the time when the subscriber wants to view, and transmission format specifying information for specifying which format of 4 M bits/sec digital information or 45 M bits/sec digital information is desired.

In this case, the information of the time may be used as it is as the request time information, however in this embodiment, several classes are defined depending on the urgency of a request, and the request time information specifies a class. In detail, ① if a user wants to view the program immediately, then the program is demanded as A-class urgency, ② if a user wants to view later, then the program is demanded as B-class urgency, and ③ if a user wants to view within a half or one day, then the program is demanded as C-class urgency.

In this embodiment, the going-down digital information transmission channel includes digital television broadcast channel, a program of the digital television broadcast can be viewed without intentional demand by a subscriber. The class of this digital television broadcast channel is referred to as D-class hereinafter.

In this embodiment, in the 45 MHz×15 channel transmission band for the going-down digital transmission data, the transmission capacity is allocated dynamically to the demand urgency classes dependently on the actual traffic condition of respective time zones in a day in order to use efficiently the transmission capacity.

For example, in prime time zone, the capacity is allocated as described hereinunder.
Transmission to A-class demand: 45 M bits/sec×5 channels
Transmission to B-class demand: 45 M bits/sec×8 channels
Transmission to C-class demand: No allocation
Transmission to D-class: 45 M bits/sec×2 channels In midnight time zone when a few demands are generated, the capacity is allocated as described herein under.
Transmission to A-class demand: 45 M bits/sec×2 channels
Transmission to B-class demand: 45 M bits/sec×2 channels
Transmission to C-class demand: 45 M bits/sec×10 channels
Transmission to D-class: 45 M bits/sec×1 channel It is considered that many demands for video programs are requested in prime time, no program is transmitted to C-class demands and more number of channels is allocated for transmission to A-class and B-class demands in order to transmit programs with a waiting time as short as possible.

Two channels are allocated to D-class transmission in order to provide many digital broadcast programs in prime time.

On the other hand, it is considered that a few demands for digital television broadcast programs is requested in the midnight time zone and the number of broadcast programs may be not many, the number of transmission channels for digital television broadcast is reduced by one channel comparing with the number in prime time zone. It is considered that a fewer demands for video programs is requested in the midnight time zone than in prime time zone, then the number of channels for transmission to A-class and B-class demands is reduced, and more transmission capacity and more channel are allocated to C-class demands so that C-class demands which have been accepted previously are transmitted.

Figure 11:
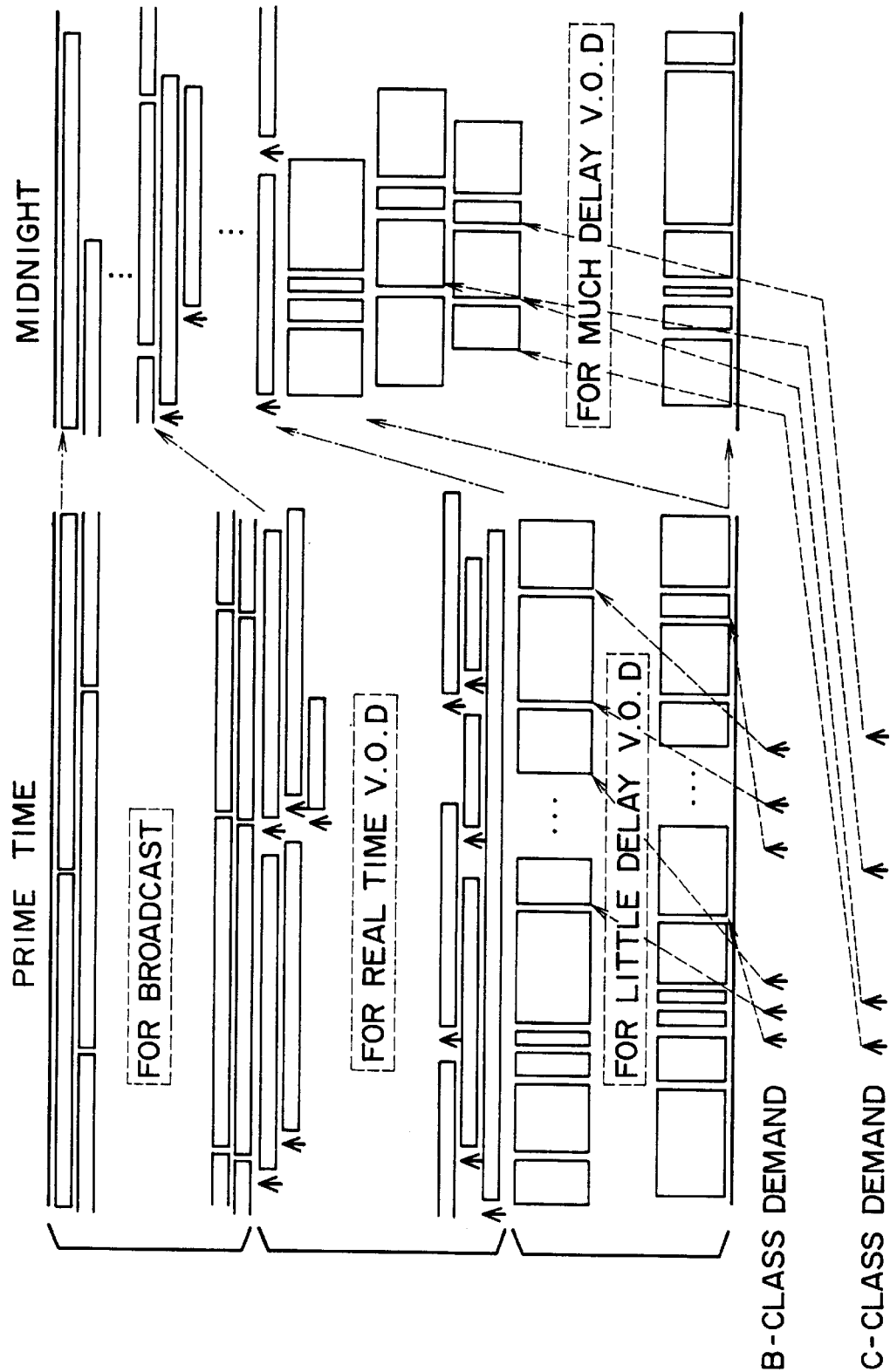
FIG. 11 is a diagram for illustrating the use of the going-down transmission channels in one embodiment of the two-way information transmission system in accordance with the present invention.

An example of the allocation of transmission capacity for the going-down digital transmission data allocated as described herein above is shown in FIG. 11. In FIG. 11, the abscissa represents the time, and the axis of ordinate represents the allocation of 15 channel capacity for the digital transmission data.

An arrow ↑ represents a time point of generation of a distribution transmission request command, and a section enclosed by a rectangle represents a program. "For broadcast" represents the transmission capacity for digital television broadcast, "real time V. 0. D." represents the transmission capacity for real time transmission of A-class demands, "little delay V. 0. D" represents the transmission capacity for digital information transmission of B-class demands, and "much delay V. 0. D" represents the transmission capacity for digital information transmission of C-class demands like the above-mentioned FIG. 2.

As shown in FIG. 11, no transmission capacity is allocated for transmission of C-class demands in primetime. The allocated channels "real time V. 0. D" transmits in real time in response to a demand, and the allocated channel "little delay V. 0. D" transmit with a little delay from a demand with looking for a free channel. The transmission time of one program can be shorter than the transmission time by way of the allocated channel to "real time V. 0. D" because of 45 M bits/sec transmission in this case.

In the midnight time zone, more channels are allocated to "much delay V. 0. D", and many programs are transmitted to the previously accepted C-class commands which allows much delay. Accordingly, the midnight time zone when usually a little demand is generated is used efficiently, and the transmission is performed efficiently.

[Generation and transmission of distribution transmission request signal]

Figure 12:
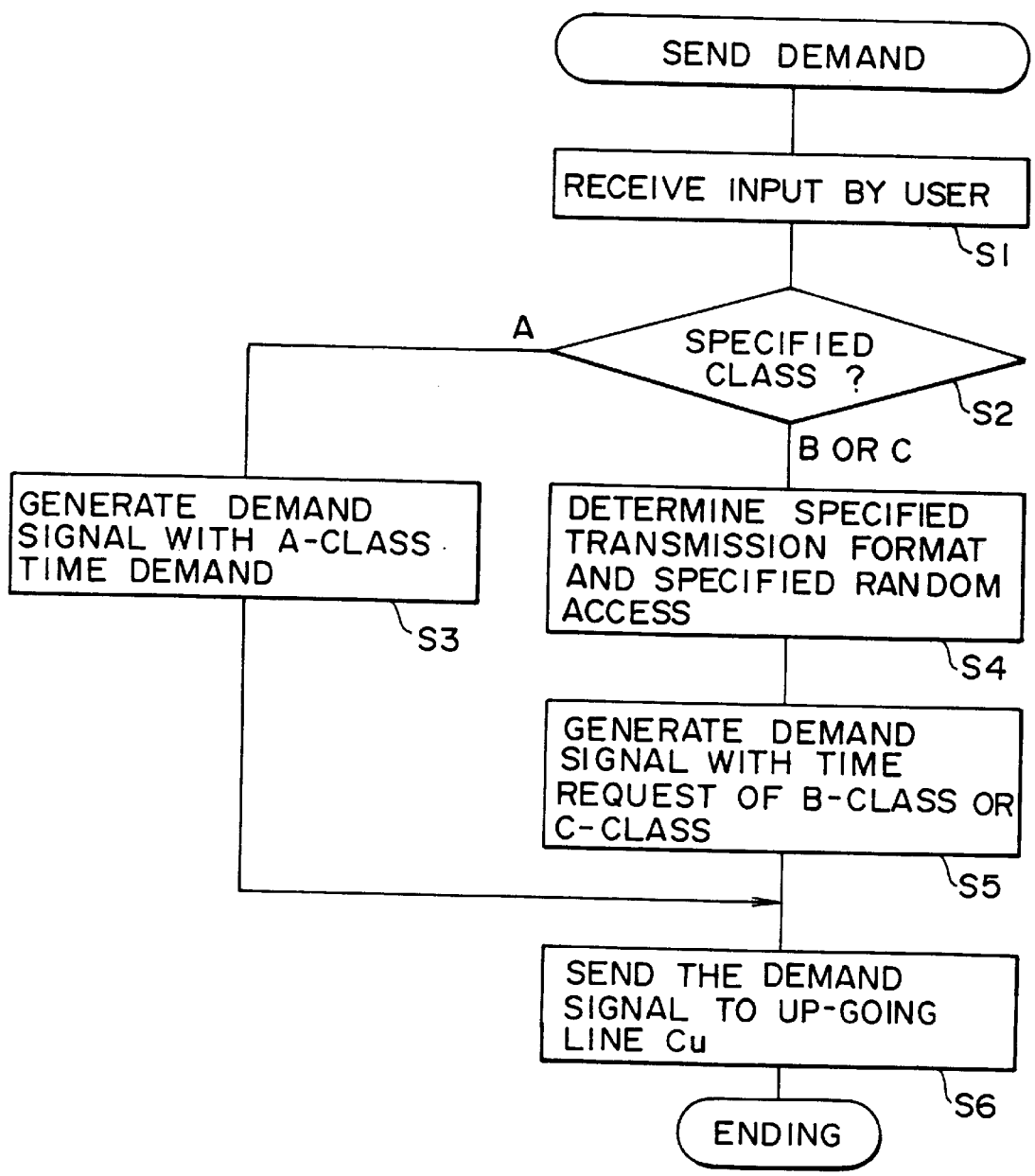
FIG. 12 is a flow chart for describing an example of demand transmission processing from a subscriber terminal in one embodiment of the two-way information transmission system in accordance with the present invention.

FIG. 12 is a flow chart of routine for generation and transmission of demand signals of video on-demand at a subscriber terminal.

Upon receiving a command input for sending a distribution transmission request form a user through the user interface in the subscriber terminal ms, the processing routine shown in FIG. 12 starts. In detail, a operational input of a user is received in the step S1, what class is specified as request time information is judged in the next step S2. If the request time information is A-class, then the process proceeds to the step S3 and A-class demand signal is generated, then the demand signal is sent to the going-up line Cu in the step S6.

If the request time information is B-class or C-class, the process proceeds to the step S4, the specification of transmission format is judged to be transmission rate of the transmission data of 4 M bits/sec or 45 M bits/sec, and the specification of random access is judged. Then, the process proceeds to the next step S5, a demand signal including the judged format, random access, and urgent class is generated, and the demand signal is sent to the going-up line Cu in the step S6.

The distribution transmission request demand signal includes a user ID for identifying the subscriber terminal and a program identifying data for identifying a desired video program as described hereinbefore.

[Receiving processing of distribution transmission request demand]

FIG. 13 is a flow chart of processing routine for receiving a demand signal from a subscriber terminal in the HE controller 24 of the cable television station HE.

Upon receiving the demand signal sent from a subscriber terminal through the going-up line Cu, the transmission request receiving analysis means 5 of the cable television station HE transfers the request time information included in the demand signal to the transmission planning means 4, and transfers the user ID and program identifying data to the information transmission control means 3. (step S11).

The transmission planning means 4 analyzes the request time information, and judges which demand class of A-class, B-class, or C-class is included in the request time information included in the demand signal (the step S12). If the request time information is A-class which requests real time transmission, then the transmission planning means 4 looks for a free going-down line transmission channel assigned to "for real time V. 0. D" shown in FIG. 11, and if the transmission planning means 4 finds a free channel, then the free channel is decided to be a real time transmission channel (the step S13).

Upon receiving this decision, the information transmission control means 3 informs of the real time transmission channel to the subscriber who sent the demand (the step S14), and extracts the video program specified by the program identifying data from the digital source 1, and performs the real time transmission (the step S15).

When, the digital transmission data is fetched from the video server 21 and transmitted by way of the channel of the above-mentioned "for real time V. 0. D".

If the request time information judged in the step S12 is B-class and is the transmission request which allows a little delay, the transmission planning means 4 looks for a free channel from the going-down channel "for little delay V. 0. D" in FIG. 11 for B-class, and decides a transmission time so as to transmit by way of the free channel (the step S16).

The transmission planning means 4 informs of the free channel to be used for the transmission, transmission time, and above-mentioned analysis result to the information transmission control means 3. Further, the transmission planning means analyzes the transmission format information included in the demand signal and random access information, and informs of the analysis result to the information transmission control means 3.

The information transmission control means 3 transmits previously the free channel, transmission time (starting time and ending time), transmission format (4 M bits/sec transmission rate or 45 M bits/sec transmission rate), and random access information to the subscriber who sent the demand and is specified by the user ID as the going-down information having the user ID header information (the step S18), when the time comes to the transmission time (the step S19), the information transmission control means 3 extracts the specified video program based on the program identifying data included in the transmission request demand and transmission format from the video server 21 in the case of the transmission rate of 4 M bits/sec or from the tape information library system 22 in the case of the transmission rate of 45 M bits/sec, and transmits it (the step S20).

If the request time information is determined to be C-class in the step S12, that is, the transmission request allows much delay of a half day to one day, the transmission planning means 4 finds out a free channel from the transmission plan of the going-down line channels (("for much delay V. 0. D) shown in FIG. 11) assigned to the midnight time zone, and decides a transmission time so as to transmit by way of the free channel (the step S17).

Then, the transmission planning means 4 informs the free channel to be used for the transmission, transmission time, and above-mentioned analysis result to the information transmission control means 3. Further, the transmission planning means 4 analyzes the transmission format information included in the demand signal and random access information, and gives the analysis result to the information transmission control means 3.

The information transmission control means 3 transmits previously the free channel, transmission time (starting time and ending time), transmission format (4 M bits/sec transmission rate or 45 M bits/sec transmission rate), and random access information to the subscriber who sent the demand and is specified by the user ID as the going-down control data having the user ID header information (the step S18), and when the time comes to the transmission time (the step S19), the information transmission control means 3 extracts the specified video program based on the program identifying data included in the transmission request demand and transmission format from the video server 21 in the case of the transmission rate of 4 M bits/sec or from the tape information library system 22 in the case o f the transmission rate of 45 M bits/sec, and transmits it (the step S20).

[Receiving processing of a control data and transmission data in a subscriber terminal]

FIG. 14 is a flow chart of a processing routine performed when the terminal controller 320 of a subscriber terminal receives a going-down control data and transmission digital data.

The subscriber terminal receives a control data of the transmission plan addressed to the demand subscriber terminal referring to the user ID in the going-down control data from the going-down line Cd (the step S21), analyzes it (the step S22), and judges whether it requires the immediate real time transmission referring to the analysis result (the step 523). The judgment may be based on, for example, no inclusion of transmission time data in the going-down control data. Alternately, a class information or flag which indicates whether it requires the real time transmission or does not is included in the going-down control data, and the judgment may be performed based on the class information or flag.

If the judgment result based on the analysis shows the real time transmission, the terminal controller 320 acquires the information of the transmission channel, and supplies a select signal for converting the going-down digital transmission data of the transmission channel to a data having a frequency band which can be demodulated to the frequency conversion circuit 308, switches the switch circuit 318 so as to select 4 M bits/sec data from the de-multiplexing circuit 317, and switches the switch circuit 315 so as to select the television signal from the digital television decoding circuit 319 to supply it to a television through the output terminal 316 (the step S24).

If the judgment result in the step S23 does not show an immediate real time transmission, then the terminal controller 320 recognizes the transmission time, transmission channel, transmission format, and random access information based on the analysis result of the above-mentioned going-down control data, and prepares for receiving (the step S25). The terminal controller 320 waits for the transmission time of the transmission information (the step S26), and when the time comes to the transmission time, the terminal controller 320 supplies a select signal for converting the going-down digital transmission data of the transmission channel to a data having a frequency band which can be demodulated to the frequency conversion circuit 308, and starts to receive the digital transmission data according to the transmission format (the step S27).

Any one medium which is to be used for storing the transmission information is selected previously from the semiconductor memory, hard disk device, data streamer, and digital VTR in the temporary memory device 320 according to the transmission format included in the going-down control data and random access information (the step S28), and the received transmission information is stored in the selected temporary memory device (the step S29).

In this case, if the transmission format specifies high speed transmission and the semiconductor memory is selected as the temporary memory means, the transmission information is transmitted with the high speed transmission rate of 45 M bits/sec, and the transmission data is stored in the semiconductor memory 331 which serves as the temporary memory means as it is high speed transmission rate.

For example, if the transmission rate of a compressed digital data is 1.5 M bits/sec and a program is a two-hour program, the program compressed to 45 M bits/sec rate is transmitted, then the transmission requires only about 4 minutes, and alternately if the transmission rate is 4 M bits/sec, the transmission of a two-hour program requires only about 11 minutes.

In the case that the transmission date rate is 4 M bits/sec due to the transmission format, the selection of a temporary memory mans depends on random access, and the hard disk device is selected for high random access and the data streamer device 333 is selected for low random access as the temporary memory means.

High fee may be applied to the request for low rate format transmission in real time, on the other hand, low fee may be applied to the request for high speed rate because the transmission time is short.

As described herein above, the receiving processing of the transmission information is performed in a subscriber terminal. The television signal received in real time transmission is supplied to a television without storing in the temporary memory device. Therefore, a user can view the program with a slight delay from the demanding.

On the other hand, the video data stored in the temporary memory device 330 is regenerated at the arbitrary time and provided to the subscriber in response to a regeneration request from the subscriber through the user interface 321. In detail, the subscriber inputs a regeneration request of the program which was transmitted with a delay through the user interface 321, the terminal controller 320 receives the regeneration request, and sends a regeneration command to the temporary memory device in which the video program is stored.

Upon receiving the regeneration command, the temporary memory device reads the corresponding digital video data of the program, and supplies it to the digital television decoding circuit 319 through the switch circuit 318. In this case, the rate of the read digital data is 4 M bits/sec. The video signal from the decoding circuit 319 is supplied to a television through the output terminal 316, and provided to the user.

For the case that a plurality of video programs is registered in the temporary memory device due to a plurality of demands, the terminal controller 320 of a subscriber terminal ms is provided with a function to display the menu of accumulated video programs, the user can select and view any program from the menu.

In this embodiment, a program stored in the temporary memory device 330 is once regenerated in response to a regeneration request by the user, then the program is erased from the corresponding temporary memory device in response to an erasing command from the terminal controller 320 to prevent the program information from being copied illegally.

In the first embodiment described herein above, a user can demand not only the immediate real time transmission but also the delayed transmission, therefore, a user who wants to view the program in prime time zone can demand for the program to be transmitted during the midnight time zone and the program is stored in the temporary memory device, and the user can view the demanded program at the desired time.

The above-mentioned demand-delayed view system favors the demand for immediate real time transmission in prime time to decrease. Many types of demand are available dependent on the urgency classes, therefore, for example, it is possible to apply the lower fee to the demand allowable of delayed transmission than that to the demand for immediate real time transmission, such fee system favors the demand in prime time to decrease.

Such suppressed generation of the immediate real time transmission in prime time allows the cable television station to be provided with a smaller scale facility in comparison with the conventional cable television station which transmits programs only in real time.

Transmission capacity of going-down digital transmission data is allocated to an independent plurality of transmission channels depending on the information relating to the urgent class in the demand and many channels are allocated to the immediate real time transmission in prime time, on the other hand, many channels are allocated to the delayed transmission in midnight, such change of allocation depending on the time zone allows the transmission capacity to be used efficiently.

In the above-mentioned embodiment, high speed transmission is possible for delayed transmission in comparison with real time transmission, and the time required for transmission of one program is shortened in comparison with the conventional method, in this aspect also, the transmission capacity is used efficiently.

In the above-mentioned first embodiment, allocation of the number of transmission channels depending on the information relating to the urgency class of the demand is changed in the time zone in a day, but the allocation may be changed dependently on days in a week, or may be changed in combination of time zone and week.

In the above-mentioned embodiment, the allocation of transmission channels depending on the information relating to the urgency class of the demand is changed within only the transmission capacity of the going-down digital information data, but, because the audience rate of analog television broadcast decreases, the transmission band of analog television broadcast is reduced and the reduced transmission band is used as the transmission band of digital information data.

In this case, a program table including channel assignment different between prime time and midnight is prepared for analog television broadcast, and this program table is transmitted to subscribers previously to inform the change of program channel depending on the time zone.

A plurality of data compression systems of digital transmission data is provided in the cable television station, for example, depending on requested degree of resolution, and any one of data compression systems may be selected by way of the demand from a subscriber terminal. In this case, a plurality of decoders are provided in a subscriber terminal depending on the above-mentioned plurality of data compression systems, the information including compression system information in the going-down control data from the television station is sent to the subscriber terminal, and the decoder is switched dependently on the compression system information.

In the above-mentioned embodiment, B-class demand is stored necessarily in the temporary memory means, but because it is possible to display the transmission time sent from the station on a display of a subscriber terminal and to inform it to a user, a mode for specifying real time transmission regeneration for B-class demand without storing in the temporary memory means may be provided.

Further in the above-mentioned embodiment, the temporary memory means is selected based on the transmission format and random access relating information in the going-down control data in a subscriber terminal, but alternately a demand signal sent from a subscriber terminal is stored in the subscriber terminal, and the temporary memory means may be selected for the transmitted transmission data depending on the stored demand signal. In this case, an identification data ID for identifying the demand signal may be added in the demand signal to judge the demand. In this case, the information relating to transmission format and random access is not necessarily included in the going-down control data.

Second embodiment

The second embodiment shows an example in which an existing CATV cable network is used. In a conventional CATV cable network, a cable television station is connected to a plurality of subscriber terminals by way of coaxial cable, and provides mainly analog television broadcast to each subscriber terminal by way of coaxial cable.

In the second embodiment, a facility for transmission of digital data such as video data is added to a cable television station without change of the conventional transmission line facility using coaxial cable, and a receiving unit for receiving digital data provided with a large capacity temporary memory device is added to a subscriber terminal. The public phone network is used as the going-up line for transmission of digital data demand.

FIG. 15 shows the whole network structure of the embodiment. In a cable television station 40, an analog television broadcast signal Va from the above-mentioned analog television broadcast facility 401 and digital data Vb such as digital video data from the digital transmission data transmission facility 402 are synthesized to generate a frequency multiplexed signal, and sent to the coaxial cable CB through an amplifier 404.

A plurality of telephone lines L1 to Ln is connected to the public phone network PSTN, and a station side controller 405 for receiving demands from subscribers through the telephone lines L1 to Ln and for sending video programs corresponding to the demand from the digital data transmission facility 402.

Also in this embodiment, the station side controller 405 generates a going-down control data Vc including a user ID for specifying the addressed subscriber terminal which receives the digital data, program ID, transmission channel, and transmission time information in order to send the digital data to the subscriber terminal which transmitted the demand, supplies it to a synthesizer 403 to frequency-multiplex the information for transmission of the going-down control data Vc, and sends it to a subscriber terminal.

FIG. 16 shows the frequency assignment of frequency multiplexed signal for transmitting in the coaxial cable CB, 50 MHz to 450 MHz frequency band is used for analog television broadcast signals as it is used conventionally. The frequency band around 500 MHz is used for the going-down control data having a transmission rate of 1.5 M bits/sec as it is used in the above-mentioned embodiment. Two frequency bands in higher frequency are used for transmission of the going-down digital data having a transmission rate of 45 M bits/sec. In other words, two channels are assigned to digital data.

Subscriber terminals 50 are connected to the coaxial cable CB through coaxial confluent distributors 60 as it is so connected in the sectional network in the above-mentioned embodiment. The coaxial confluent distributor 60 comprises an input buffer amplifier 61 for receiving information from the coaxial cable CB connected to the coaxial confluent distributor connected in front, a distributor 62 for identifying the signal between a signal to be distributed to the subscriber terminal connected to the coaxial confluent distributor and a signal to be distributed to subscriber terminals in the down stream, and an output buffer amplifier 63 for supplying output signal to subscriber terminals in the down stream.

A subscriber terminal 50 is connected to the public phone network PSTN through a telephone line Lms as shown in FIG. 15. A telephone 70 is connected to the telephone line Lms through the subscriber terminal 50, and a television 80 is connected to the subscriber terminal 50.

Figure 17:
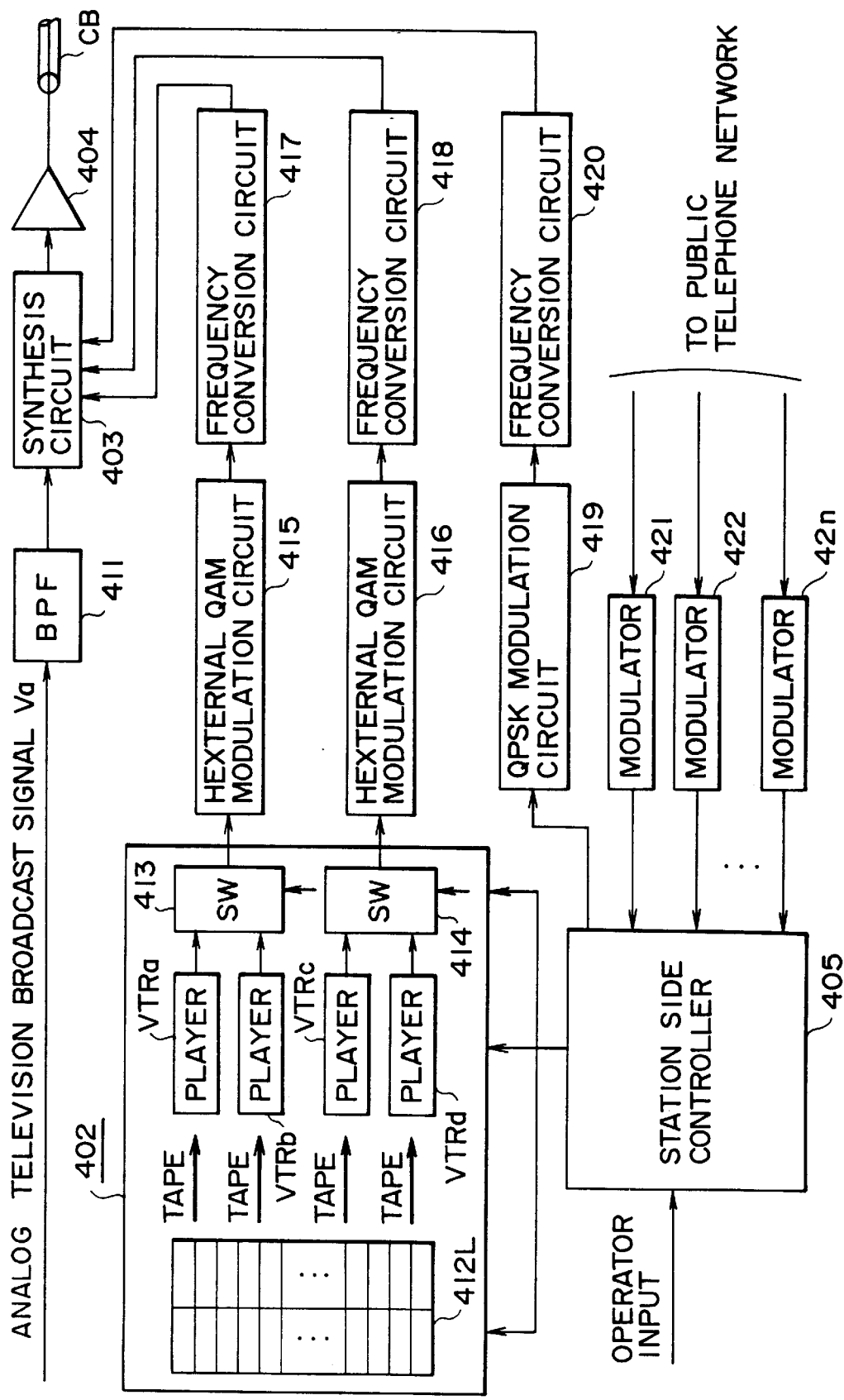
FIG. 17 is a block diagram for illustrating a structural example of a cable television station in another embodiment of the two-way information transmission system in accordance with the present invention.

The cable television station 40 has in detail, for example, a structure shown in a block diagram of FIG. 17. In detail, an analog television broadcast signal Va is subjected to band restriction to generate a signal of the band for the above-mentioned analog television broadcast through a band pass filter 411, and thereafter is sent to a synthesis circuit 403.

The digital transmission data transmission facility 402 is provided with a tape information library system 412. The tape information library system 412 comprises a tape container rack 412L, a plurality of players VTRa to VTRd, a transferring mechanism (not shown in the figure) for taking out a desired cassette tape from the tape container rack and for charging it to any one of the players VRTa to VTRd as it is so structured in the above-mentioned embodiment, but in this second embodiment, two players VTR are provided to each channel, that is, total four players VTRa, VTRb, VRTc, and VTRd are provided, the facility is simplified in comparison with the tape information library system of the above-mentioned cable television station HE having the digital facility.

The station side controller 405 controls the selection of a channel out of the two channels and decides the selection of a player out of the two players by switching and controlling switch circuits 413 and 414.

Digital data from respective switches 413 and 414 is modulated in hexternal QAM modulation circuits 415 and 416 as it is so modulated in the above-mentioned embodiment, subsequently supplied to the frequency conversion circuits 417 and 418, and frequency-converted to a signal of the band for each channel shown in FIG. 16. The output signal of the frequency conversion circuits 417 and 418 is supplied to the synthesis circuit 403.

A going-down control data Vc from the station side controller 405 is supplied to a QPSK modulation circuit 419 and modulated, then frequency-converted to a signal of the band for control data shown in FIG. 16. The output signal from the frequency conversion circuit 420 is supplied to the synthesis circuit 403.

A going-up demand data sent from a subscriber terminal through the telephone lines L1 to Ln is taken in the station side controller 405 through modulators 421 to 42n. The going-down control data Vc is generated based on the going-up demand data. The demand data includes a user ID for identifying the subscriber terminal, data for identifying the requested program, and request time information described hereinafter.

Figure 18A:
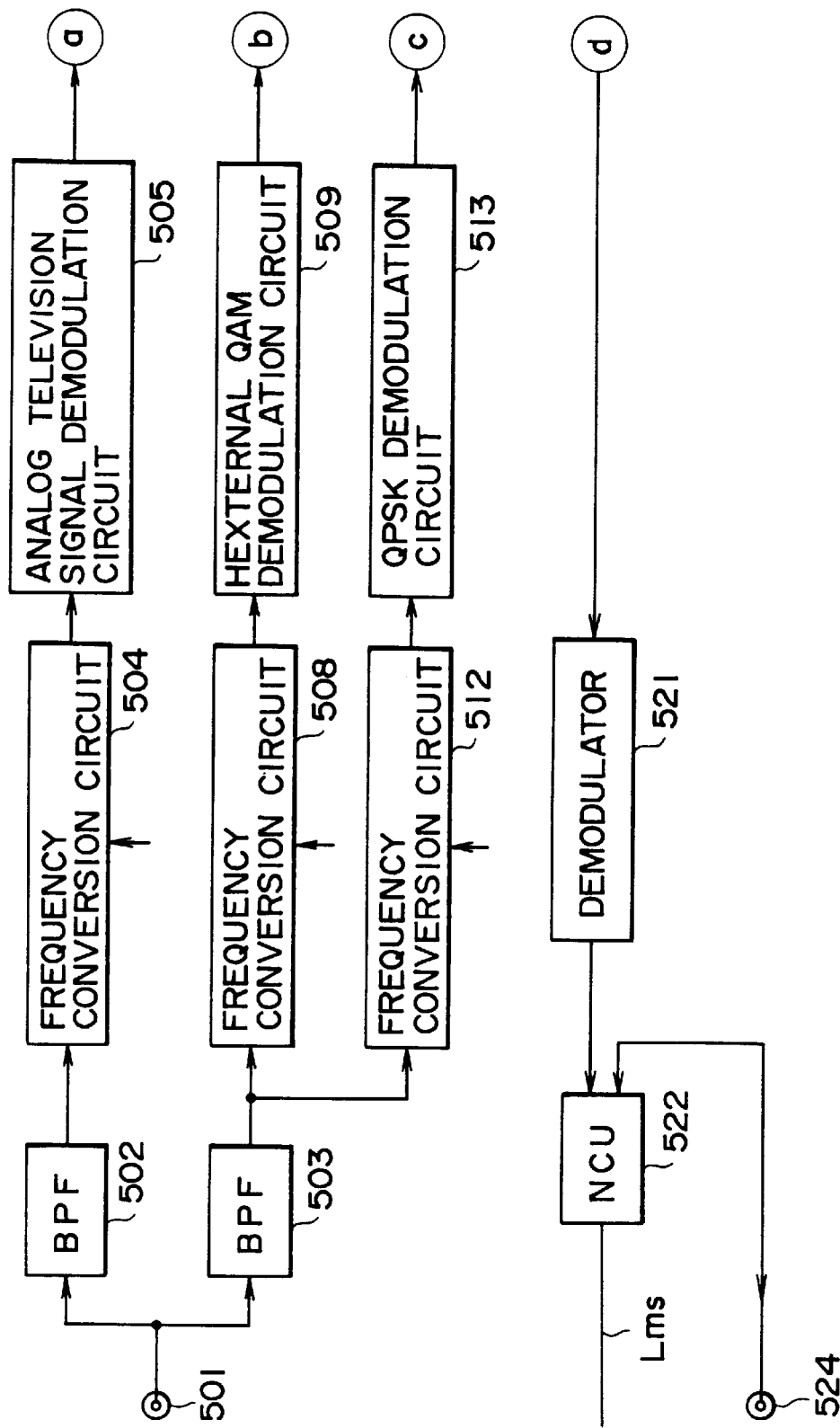
FIG. 18 is a block diagram for illustrating structural example of a subscriber terminal in another embodiment of the two-way information transmission system in accordance with the present invention.

Next, a subscriber terminal has a structure, for example, shown in detail in a block diagram of FIG. 18.

The going-down signal from the coaxial confluent distributor 60 is supplied to band pass filters 502 and 503 through a input terminal 501. The band pass filter 502 has a pass band of the analog television broadcast signal frequency band shown in FIG. 16, the analog television signal obtained from the band pass filter 502 is supplied to a frequency conversion circuit 504.

The channel selection control signal corresponding to the channel selection operation through the user interface 530 from the terminal controller 520 is supplied to the frequency conversion circuit 504, and the analog broadcast program channel signal selected by a user is converted by the frequency conversion circuit 504 to a signal of a frequency which can be demodulated by the subsequent analog television demodulation circuit 505. The output signal from the frequency conversion circuit 504 is supplied to the analog television demodulation circuit 505, and the television signal of the above-mentioned selected analog television broadcast program channel is demodulated. The demodulated television signal is supplied to an output terminal 507 through a switch circuit 506.

A television 70 is connected to the output terminal 507. A user interface 530 comprises a remote controller and key board device as it so comprises in the above-mentioned embodiment.

The going-down control data and going-down digital information data are obtained from the band pass filter 503.

The going-down control data is converted by a frequency conversion circuit 512 to a signal of a band which can be demodulated by the subsequent QPSK demodulation circuit 513, then supplied to a QPSK demodulation circuit 513 and demodulated. The demodulated control data is supplied to a de-multiplexing circuit 514, and only the control data of the channel given to the demand subscriber terminal by the control signal from the terminal controller 520 is taken out, and supplied to the terminal controller 520.

The terminal controller 520 interprets the control data, judges whether the control data is addressed to the demand subscriber terminal based on the user ID included in the control data, and if the control data is addressed to the demand subscriber terminal, the terminal controller 520 analyzes the control data and informed of the above-mentioned program ID, transmission time, and transmission channel (which channel out of the digital data transmission channels).

The digital information data from the band pass filter 503 is supplied to a frequency conversion circuit 508. In the frequency conversion circuit 508, only the information data of the transmission channel found by analyzing the above-mentioned control data is converted to a signal of a frequency which can be demodulated by a hexternal QAM demodulator 504 based on the control signal from the terminal controller 520. The output signal from the frequency conversion circuit 508 (¥3) is supplied to the hexternal QAM demodulation circuit 509 and demodulated, the demodulated signal is supplied to a data streamer device 510 and temporarily stored.

The terminal controller 520 outputs a regeneration command including the program ID to the data streamer device 510 in response to the regeneration request input including the program ID through the user interface 530 of the user. The data streamer device 510 reads and regenerates the digital information specified by the program ID out of temporarily stored information in response to the regeneration command.

The read digital information is subjected to error correction decode processing in a digital television signal decoding circuit 511, converted to an analog television signal, and supplied to the switch circuit 506.

The switch circuit 506 is switched either to the analog demodulation circuit side for analog television broadcast receiving channel selection or to the digital television signal decoding circuit 511 side for viewing the temporarily stored program dependently on the switching signal from the terminal controller 520 in response to the user input through the user interface 530, the user can view the respective programs in the television connected to the output terminal 507.

The terminal controller 520 generates a demand signal as a going-up data in response to a demand input for a digital information program through the user interface 530. The demand signal includes the user ID, ID of the demanded program, and request time information of the urgency for the demanded program as it so includes in the above-mentioned embodiment. If the same plurality of compression methods as used for digital transmission of video signal transmitted from the cable television station side is provided and a user can select the compression method dependently on the demanded information and necessary resolution, then the demand signal includes the transmission format such as data compression ratio.

The demand signal from the subscriber terminal is modulated by a modulator 521, and sent out to the telephone line Lms connected to the public telephone network through NCU (network control unit) 522. A telephone 70 is connected to NCU 522 through the telephone terminal 524, and the telephone 70 is used as it is used usually.

In the second embodiment, the cable television station 40 is acceptable of only transmission request for delay allowable demands corresponding to B-class and C-class demands in the above-mentioned first embodiment. More in detail, real time transmission and digital television broadcast are not involved, two-way information transmission is realized only with adding some additional facility to the existing cable television system facility.

In this embodiment, when a user inputs a demand to the subscriber terminal, the user selects a request time information which is either B-class demand allowable of little delay or C-class demand allowable of a delay of from a half day to one day.

Upon receiving the demand from the user through the public telephone network PSTN, the cable television station 40 plans a transmission plan so as to transmit successively requested programs if the demand is B-class. In detail, if there is a free channel in the going-down digital information data band, the cable television station 40 plans the transmission plan so as to transmit the demanded program information to the subscriber terminal by way of the free channel.

Upon completion of the transmission plan, the cable television station 40 transmits previously a going-down information including the time when the requested program is to be transmitted, the channel to be used for the transmission, and the going-down control data including transmission format information to the subscriber terminal which transmitted the demand.

The subscriber terminal 50 acquires the control data addressed to the demand subscriber terminal, and is informed of previously the time to be transmitted, channel to be used for the transmission, and transmission format, and prepares for receiving. Monitoring the time for finding the transmission time, the subscriber terminal 50 receives the digital information data transmitted with a address to the demand subscriber terminal 50 through the above-mentioned band pass filter 503, frequency conversion circuit 508, and hexternal QAM demodulation circuit 509, and stores the received digital information data in the data streamer device 510.

When the user input at an arbitrary time a regeneration request for the selected specified program out of temporarily stored programs through the user interface 530, the terminal controller 520 sends a regeneration command of the specified program to the data streamer device 510. The data streamer device 510 reads and regenerates the specified program in response to the regeneration command, and supplies the television signal to the television through the output terminal 507, and the user can view the program.

As described herein above, in the case of the second embodiment, the real time transmission is not necessary, the introduction of a large scale system such as video server is not necessary, the video on-demand system is realized with a relatively small investment, the digital information data can be transmitted with a delay efficiently during the time zone such as midnight when traffic is infrequent, thus the transmission band can be used efficiently.

A demand signal is sent to the television station through the public telephone network, therefore it is unnecessary to provide extra transmission line for going-up data, thus extra investment for this purpose is not necessary.

The application of this invention to the video on-demand system is described hereinbefore, however, the present invention can be applied to not only video system but also other every two-way information transmission systems which transmit various information in response to a demand.

As described hereinbefore, according to the present invention, the video on-demand system can be realized without introduction of large scale system such as video server and with relatively small investment. The centralization of traffic is mitigated, and the network resource is used efficiently.

What is claimed is:

1. A two-way information transmission system provided with an information distribution transmission center and at least one subscriber terminal connected to said information distribution transmission center via an up-going line and a down-going line, said subscriber terminal sending an information distribution transmission request to said information distribution transmission center through said up-going line, and said information distribution transmission center transmitting requested information in response to said request through said down-going line, said two-way information transmission system comprising:

an information distribution transmission center including:
transmission planning means for planning a transmission plan to transmit requested information based on an information distribution transmission request from a subscriber terminal,
transmission means for transmitting said requested information based on said transmission plan planned by said transmission planning means,
a plurality of transmission channels allocated for use for a plurality of urgency levels, wherein a number of said plurality of transmission channels allocated for a high urgency level increases in accordance with an increase in a number of requests for information distribution transmission, and
down-going control data sending means for sending down-going control data including information involving said transmission plan planned by said transmission planning means to said subscriber terminal which sent said information distribution transmission request, before said transmission means transmits said requested information; and a subscriber terminal including:
distribution transmission request sending means for sending said information distribution transmission request including at least information for identifying said subscriber terminal making said request, information for identifying said requested information, and urgency information relating to an urgency level of said requested information, said urgency information including a real time transmission request,
memory means,
transmission plan receiving analysis means for receiving and analyzing said transmission plan based on said down-going control data from said information distribution transmission center,
information acquisition means for acquiring said requested information transmitted from said information distribution transmission center based on said transmission plan and storing said requested information in said memory means, wherein when said urgency information is a real time transmission request said requested information transmitted from said information distribution transmission center is supplied without being stored in said memory means, and when said urgency information is other than said real time transmission request said requested information is stored in said memory means, said requested information having been acquired by said transmission plan receiving analysis means, and
reading means for reading said information from said memory means.

2. The two-way information transmission system as claimed in claim 1, wherein
said urgency information included in said information distribution transmission request specifies any one of said plurality of urgency levels which have different respective delay times from said distribution transmission request to transmission of said requested information depending on said urgency level of said urgency information, and
said transmission planning means determines a transmission time based on said urgency level included in said information distribution transmission request.

3. The two-way information transmission system as claimed in claim 1, wherein said information distribution transmission center transmits in real time in response to said real time transmission request which requests immediate transmission, and transmits in a free channel of an available time zone when said urgency information allows for a time delay before transmission.

4. The two-way information transmission system as claimed in claim 1, wherein said transmission means transmits said requested information after data compression, and selects a data compression method from a plurality of data compression methods according to a type of information to be transmitted.

5. The two-way information transmission system as claimed in claim 4, wherein
at least one of said plurality of data compression methods used by said transmission means transmits said requested information at a speed faster than a data transmission speed of information regenerated in real time in said subscriber terminal, and
said memory means of said subscriber terminal stores said transmitted requested information at a high speed.

6. The two-way information transmission system as claimed in claim 1, wherein
said memory means comprises a plurality of recording devices disposed in parallel, said plurality of recording devices including tape type recording media, sheet type recording media, card type recording media, disk type recording media, and semiconductor memories, and
said information acquisition means records said information in a recording device selected from said plurality of recording devices depending on a volume of said information to be stored and a degree of random access required.

7. A method of two-way information transmission in which a subscriber terminal requests an information distribution transmission from an information distribution transmission center through an up-going line, and said information distribution transmission center transmits said requested information in a down-going line in response to said information distribution transmission request, said method comprising steps of:
said subscriber terminal sending an information distribution transmission request including at least information for identifying said subscriber terminal sending said request, information for identifying said requested information, and urgency information relating to an urgency level of said requested information, said urgency information including a real time transmission request;

said information distribution transmission center planning a transmission schedule of said requested information to be transmitted based on said information distribution transmission request from said subscriber terminal, and transmitting said planned transmission schedule to said subscriber terminal which requested said information distribution transmission request in down-going control data prior to transmission of said requested information, and transmitting said requested information according to said planned transmission schedule;

said information distribution transmission center allocating a plurality of transmission channels for use for a plurality of urgency levels, wherein a number of said plurality of transmission channels allocated for a high urgency level increases in accordance with an increase in a number of requests for information distribution transmission; and said subscriber terminal receiving said transmission plan and analyzing said down-going control data from said information distribution transmission center, acquiring said requested information transmitted from said information distribution transmission center based on said transmission plan, storing said acquired information in memory means having a large capacity when said urgency information is other than a real time transmission request, and providing said information read from said memory means for use, wherein when said urgency information is a real time transmission request said acquired information is supplied for use without being stored in said memory means.

8. The method of two-way information transmission as claimed in claim 7, wherein said information distribution transmission center transmits in real time in response to said real time transmission request which requests immediate transmission included in said information distribution transmission request from said subscriber terminal, and transmits in a free channel of an available time zone when said urgency information allows for a time delay before transmission.

9. The method of two-way information transmission as claimed in claim 7, wherein said urgency information included in said information distribution transmission request specifies any one of said plurality of urgency levels each having a different delay time from a distribution transmission request to transmission of said requested information, and a communication capacity of said down-going line is allocated and assigned separately for each urgency level of said plurality of urgency levels.

10. The method of two-way information transmission as claimed in claim 9, wherein said communication capacity assigned to each urgency level is variable depending on a transmission time zone and day of a week.

11. A subscriber terminal of a plurality of subscriber terminals respectively connected to an information distribution transmission center through up-going lines and down-going lines, in which said subscriber terminal requests transmission of information from said information distribution transmission center through said up-going line, and said information distribution transmission center transmits said requested information through a down-going line in response to said request for transmission of information, said subscriber terminal comprising:

distribution transmission request sending means for sending an information distribution transmission request including at least information for identifying said subscriber terminal making said request, information for identifying information requested for transmission, and urgency information relating to an urgency level of said requested information, said urgency information including a real time transmission request;

memory means;

transmission plan receiving analysis means for acquiring a transmission plan of information to be transmitted, said transmission plan being planned by said information distribution transmission center based on said information distribution transmission request from said subscriber terminal, by referring to control data sent from said information distribution transmission center;

information acquisition means for acquiring said requested information transmitted from said information distribution transmission center and storing said acquired information in said memory means when said urgency information is other than a real time transmission request based on said transmission plan acquired by said transmission plan receiving analysis means, wherein when said urgency information is a real time transmission request said acquired information is supplied for use without being stored in said memory means; and reading means for reading information from said memory means, wherein said information distribution transmission center allocates a plurality of transmission channels for use for a plurality of urgency levels such that a number of said plurality of transmission channels allocated for a high urgency level increases in accordance with an increase in a number of requests for information distribution transmission.

* * * * *